(12) United States Patent
He et al.

(10) Patent No.: US 9,290,616 B2
(45) Date of Patent: Mar. 22, 2016

(54) SOLID-PHASE POLYMERIZATION METHOD FOR PREPARING HIGH-MOLECULAR-WEIGHT ALIPHATIC POLYESTER

(75) Inventors: Yong He, Shanghai (CN); Pujing Zuo, Shanghai (CN); Zinong Ye, Shanghai (CN); Masatoshi Aoyama, Shanghai (CN); Xin Zeng, Shanghai (CN); Xiangqun Fan, Shanghai (CN); Xiaji Dai, Shanghai (CN); Jing Lu, Shanghai (CN)

(73) Assignee: Toray Industries, Inc. (JP)

( * ) Notice: Subject to any disclaimer, the term of this patent is extended or adjusted under 35 U.S.C. 154(b) by 169 days.

(21) Appl. No.: 14/122,275

(22) PCT Filed: May 28, 2012

(86) PCT No.: PCT/CN2012/076152
§ 371 (c)(1),
(2), (4) Date: Nov. 26, 2013

(87) PCT Pub. No.: WO2012/163261
PCT Pub. Date: Dec. 6, 2012

(65) Prior Publication Data
US 2014/0100350 A1 Apr. 10, 2014

(30) Foreign Application Priority Data

May 31, 2011 (CN) .......................... 2011 1 0158244

(51) Int. Cl.
| | |
|---|---|
| *C08G 63/08* | (2006.01) |
| *C08G 65/46* | (2006.01) |
| *C08G 63/80* | (2006.01) |
| *C08G 63/87* | (2006.01) |
| *C08G 63/82* | (2006.01) |

(52) U.S. Cl.
CPC ............... *C08G 63/87* (2013.01); *C08G 63/08* (2013.01); *C08G 63/80* (2013.01); *C08G 63/823* (2013.01)

(58) Field of Classification Search
CPC ..... G08G 63/08; G08G 63/87; G08G 63/823; G08G 63/80
USPC .................................................... 528/274, 361
See application file for complete search history.

(56) References Cited

U.S. PATENT DOCUMENTS

| | | | |
|---|---|---|---|
| 6,140,458 | A | 10/2000 | Terado et al. |
| 6,417,266 | B1 | 7/2002 | Terado et al. |
| 6,528,617 | B1 | 3/2003 | Terado et al. |
| 8,173,753 | B2 | 5/2012 | Nagano et al. |

FOREIGN PATENT DOCUMENTS

| | | |
|---|---|---|
| CN | 1234409 A | 11/1999 |
| CN | 1327460 A | 12/2001 |
| CN | 101367913 A | 2/2009 |
| CN | 10158913 A | 11/2009 |
| JP | 2000-302852 | 10/2000 |
| JP | 2001-192443 | 7/2001 |
| JP | 2008-156665 | 7/2008 |
| WO | 01/30883 A1 | 5/2001 |

OTHER PUBLICATIONS

Supplementary European Search Report dated Sep. 30, 2014 from corresponding European Patent Application No. 12 79 2688.

*Primary Examiner* — Ling Choi
*Assistant Examiner* — Gennadiy Mesh
(74) *Attorney, Agent, or Firm* — DLA Piper LLP (US)

(57) ABSTRACT

A solid-phase polymerization method of high-molecular-weight aliphatic polyester conducts the solid-phase polymerization of aliphatic polyester prepolymer under a gas stream containing sulfonic acid catalyst. The method features preparing metal free aliphatic polyester with high molecular weight, good color and luster and perfect thermal stability efficiently. The non-metal-ion aliphatic polyester is not only applicable to common use, but is also suitable as high value-added medical material and packing material which contacts with food directly than other metal-containing polyester.

11 Claims, No Drawings

SOLID-PHASE POLYMERIZATION METHOD FOR PREPARING HIGH-MOLECULAR-WEIGHT ALIPHATIC POLYESTER

TECHNICAL FIELD

This disclosure relates to the field of high molecular material and particularly discloses a solid-phase polymerization method of preparing high-molecular-weight (HMW) aliphatic polyester.

BACKGROUND

Environmental pollution and resource shortage have become global problems in the 21$^{st}$ century. Meanwhile, they are drawing more and more attraction from human beings. The widely used synthesized molecular material made from petroleum has made great contribution to the development of human civilization. However, such materials are hard to be recycled, thus, nowadays having caused a severe problem called "white pollution." On the other hand, since petroleum is a non-renewable resource, the increasing consumption of it forced human beings to face serious resource shortage. People are expecting biodegradable plastics (mainly made from aliphatic polyester) and especially hoping development and application of such biodegradable materials from renewable resources could significantly alleviate the two problems in the near future.

There are two ways to prepare polyester: ring-opening polymerization (indirect method) and direct polycondensation (direct method). The method of ring-opening polymerization is mainly applied to monomers such as cyclic lactone and cyclic lactide. The polyester prepared through ring-opening polymerization is characterized in high weight-average molecular weight, thermal stability, vitrification temperature and melting point, thus being widely used in industry. However, to prepare polyester by ring-opening polymerization requires technologies like preparation of cyclic monomer and refining and the like, which are complicated and time-consuming, therefore raising the cost of preparing polyester in the method of ring-opening polymerization.

Another common method is to synthesize polyester by direct polycondensation. Direct polymerization of polyester is a classical polycondensation reaction, and free monomers, water (or micromolecular alcohol) and oligomers are in a balance in the reaction system. In the formula for computing polymerization degree of polycondensation reaction:

$$DP = \sqrt{\frac{K}{n_w}}$$

DP represents polymerization degree of the reaction, K represents reaction equilibrium constant and $n_w$, represents residual water.

According to the formula above, at a certain temperature, the only way to improve polymerization degree is to reduce the content of water or micromolecular alcohol since K is a constant, thus polyester with high weight-average molecular weight and melting point could be obtained. There are a lot of ways to remove water or micromolecular alcohol such as reducing pressure, raising temperature and prolonging reaction time. Generally, it is hard to prepare a polyester product with a high molecular weight by direct polycondensation. A polyester product with whose molecular weight over 50,000 is difficult to be prepared even taking no account of production efficiency, or prolonging time or adjusting temperature regardless of the cost. Aromatic polyester with a molecular weight about 10,000-40,000 is mainly synthesized in industry. To aliphatic polyester, if the molecular weight is lower than 50,000, it will lose its commercial value because of poor performance. Therefore, the method of direct polycondensation is barely used in industry to produce aliphatic polyester.

Direct polycondensation for polyester preparation mainly comprises four methods as below:

(1) Melt Polycondensation Method:

Melt polymerization is a polymerization reaction carried out at a temperature higher than the melting point of a polymer, which is a bulk polymerization. It has the advantage of being able to obtain pure product and requiring no medium separation. On the other hand, molecular weight of the product usually remains low since the more deeply the reaction processes, the harder the micromolecular by-product can be exhausted, therefore, the balance heads for the polymerization direction difficultly. As a result, polyester with high molecular weight and melting point is hard to be prepared only by melt polymerization.

(2) Azeotropy Method

The key to direct polycondensation for polyester synthesization is to exhaust water molecules. Only when most of the water molecules are exhausted can a product with a high molecular weight be obtained. An organic solvent which is not involved in the polymerization reaction and could dissolve the polymer is used in the polycondensation reaction, and it is processed with monomers and water for azeotropy and reflux reaction. Then, the reflux returns to the reaction vessel after dehydration and gradually takes trace moisture out from the reaction system and further propels the reaction towards the polymerization direction to obtain a product with high molecular weight. This is the method of azeotropic polymerization.

Currently, the method of solution polymerization for direct polyester synthesization is widely reported abroad. It could prepare a product with a high weight-average molecular weight and meet the need of practical application. Japanese Ajioka et al. have developed a technology of directly synthesizing polylactic acid through azeotropic dehydration, and weight-average molecular weight of the polylactic acid is over 300,000. Also, a series of aliphatic polyester compounds with weight-average molecular weight beyond 300,000 are synthesized directly with the same technology. By taking diphenyl oxide as a solvent, Zhao Yaoming et al. of China have prepared a polymer with a viscosity average molecular weight at 40,000 by solution polymerization.

However, disadvantages of such a method is attributed to the solvent introduced to the reaction system. The solvents with high melting points which are widely used at present such as dimethylbenzene, diphenyl ether, anisole and dibenzyl ether and the like are highly toxic, which do not only bring a bad influence to the environment, but also limit application of the polyester product prepared. In addition, massive use of the solvents has increased the production cost.

(3) Direct Polycondensation+Chain-Extension Reaction

Since direct polycondensation on monomers cannot prepare a product with a high weight-average molecular weight easily, people now are seeking a new way to obtain a polymer with a high weight-average molecular weight: to process an oligomer of the polyester prepared by direct polycondensation with a chain extender, thus obtaining polyester with a high molecular weight. Most of the substances serving as chain extenders are high-active molecular compounds with a bifunctional group or polyfunctional group.

Woo et al. adopted 1,6-hexamethylene Diisocyanate(HDI) as the chain extender, thus having increased weight-average molecular weight of polylactic acid to 76,000 from 1000. The reaction mechanism is as below:

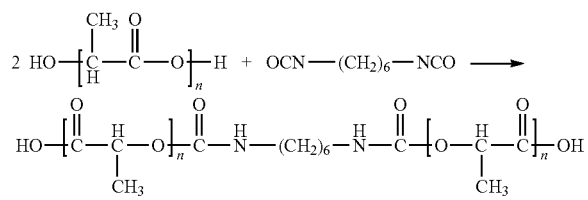

Sepplala et al. also carried out chain extension reaction with bisoxazoline and 1,6-hexamethylene Diisocyanate(HDI), and weight-average molecular weight of the polylactic acid prepared is over 200,000.

The above method brings a problem to the application of polyester because of the introduction of toxic chain extender into reaction. Besides, crystallization capacity and speed of the polyester prepared therefrom decrease and crystallinity is lowered (or crystallization may even fail), therefore resulting in low melting point or no melting point at all.

(4) Solid-Phase Polymerization Method

Solid-phase polymerization method is a polymerization reaction conducted to a solid-phase oligomer at a temperature between the glass-transition temperature and melting point of the polymer. It can improve weight-average molecular weight of polyester polymer effectively and is only applicable to the polymerization of crystalline polyester.

Mechanism of solid-phase polymerization is depicted as below: gather the functional terminal group, micromolecular monomer and catalyst in an amorphous region by crystallizing low-molecular-weight polyester prepolymer (slice and powder or the like) to make the reaction equilibrium move positively; take the micromolecular by-product out from the reaction system by decompressing or utilizing inert gas so that the molecular chain could keep growing, and a product with a high molecular weight can be obtained. The solid-phase polymerization of polyester depends on chemical reaction and physical diffusion at the same time. Through reversible chemical reaction, the micromolecular product diffuses from inside of the particle onto surface of the particle and further diffuses into the decompressing atmosphere or inert gas atmosphere around. According to the principle of low-speed decision, the reaction rate of the entire polymerization reaction depends on the slowest step mentioned above. Time and temperature of polymerization, catalyst, flow rate of pressure or inert gas, crystallinity and geometrical shape of the prepolymer may influence the process of solid-phase polymerization reaction.

The catalysts for polyester polymerization which are released at present are mainly metal compounds such as alkoxide, acetylacetonate, oxide, complex, hydroxide or salt of organic acid of titanium, stibium, germanium, magnesium, calcium, zinc, ferrum, zirconium, lithium or manganese, etc. These catalysts are highly active in polymerization, but the activity of such catalysts also results in a poor thermal stability of the polyesters synthesized, especially to the polymerization of polylactic acid. Further, these catalysts may easily lead to side reaction such as racemization of lactic acid monomer.

Mitsui Chemicals disclosed a method for preparing polyester with volatile sulfonic acid as catalyst (CN99108012.2, JP2000-302852, JP2008-156665, JP2001-192443). A product with high thermal stability can be prepared in this method since no metal catalyst is used therein. Furthermore, sulfonic acid gradually volatilizes during polymerization so only few sulfonic acid catalyst is left in the polyester product. Therefore, the product features in high hydrolysis-resistance stability. However, found a problem with the method after research: the sulfonic acid catalyst volatilizes quickly at a high polymerization temperature, causing excessively low content of the catalyst in middle and later period of polymerization and sharply decreasing the polymerization activity. Consequently, the polymerization speed remains slow and polyester with a high molecular weight is hard to be prepared. On the other hand, though volatilization of sulfonic acid catalyst can be restrained by lowering the polymerization temperature, the polymerization speed also decreases because of the low polymerization temperature. Moreover, to reduce flow rate of the gas stream (flow velocity or gas stream) during solid-phase polymerization in inert gas can also control volatilization of sulfonic acid catalyst. However, it will prevent exhaustion of the by-product from the polyester condensation reaction and finally result in low polymerization speed. In all the embodiments of using single sulfonic acid in Mitsui Chemicals' patents mentioned above, the process of solid-phase polymerization requires at least 60 hours and weight-average molecular weight of the obtained linear polyester is lower than 150,000 without exception.

CN 200910004176.3 discloses a method for preparing polyester by using disulfonic acid or polysulfonic acid as a catalyst. Because the disulfonic acid or polysulfonic acid is hard to volatize or non-volatile, content of the catalyst during the entire polymerization process basically remains the same, and the system has extremely high polymerization activity, thus high-molecular-weight can be obtained. At the same time, nonuse of a metal catalyst endows the prepared product with great thermal stability. Yet a problem still remains in the method since the product prepared contains much highly acidic disulfonic acid or polysulfonic acid which is difficult to be removed in a subsequent process, thus resulting in poor hydrolysis resistance of the product.

SUMMARY

We provide a solid-phase polymerization method to quickly prepare high-molecule-weight aliphatic polyester. High-molecule-weight aliphatic polyester, especially high-molecule-weight linear aliphatic polyester which is characterized in great thermal stability, hydrolysis resistance and good color and luster can be prepared with this method within a short term. Besides, no metal catalyst is used in this method and therefore aliphatic polyester without metal can be obtained.

The polyester can be prepared by displacing aliphatic polyester prepolymer in the gas stream which contains sulfonic acid catalyst for solid-phase polymerization, namely, by conducting solid-phase polymerization of aliphatic polyester prepolymer in the gas stream which contains sulfonic acid catalyst.

The sulfonic acid catalyst is a significant class of compounds which contain sulfonic acid group (—SO$_3$H) in the molecular formula. In addition to this, there is no special restriction to the molecular structures.

The sulfonic acid catalyst can be the same as or different from the catalyst used to prepare aliphatic polyester prepolymer. It may be monosulfonic acid or the mixture of two or multiple sulfonic acids. There is no special restriction to its type, and the sulfonic acid catalyst can be monosulfonic acid or disulfonic acid or polysulfonic acid. However, monosulfonic acid is preferred since it is easy to be removed from the catalyst removal process after solid-phase polymerization. Also, there is no special restriction to the number of carbon atom in the sulfonic acid catalyst. In consideration of the compatibility between the sulfonic acid catalyst and aliphatic polyester as well as content of it in the gas stream, sulfonic acid is preferably one or multiple of monosulfonic acid of C1-C50 and monosulfonic acid of C1-C50 substituted by halogen; more preferably, one or multiple of monosulfonic acid of C1-C30 and monosulfonic acid of C1-C30 substituted by halogen; most preferably, one or multiple of monosulfonic acid of C1-C20 and monosulfonic acid of C1-C20 substituted by halogen. Preferably, the halogen is fluorine or chlorine, and the sulfonic acid catalyst is one or multiple of aromatic sulfonic acid or one or multiple of aliphatic sulfonic acid. Preferably, the aromatic sulfonic acid is one or multiple of benzenesulfonic acid, substituent benzenesulfonic acid, naphthalene sulfonic acid or substituent naphthalene sulfonic acid. There is no special restriction to the substituent group in the aromatic sulfonic acid molecule and it can be alkyl, phenyl, alkoxy, carboxyl, hydroxyl or halogen, preferably, alkyl, phenyl, alkoxy or halogen; more preferably, alkyl, alkoxy or halogen, further preferably, alkyl or halogen; most preferably, halogen. Preferably, aromatic monosulfonic acid is one or multiple of benzenesulfonic acid, benzenesulfonic acid substituted by alkyl or benzenesulfonic acid substituted by halogen; more preferably, one or multiple of benzenesulfonic acid, para-toluenesulfonic acid or para-chlorobenzenesulfonic acid. Preferably, aliphatic sulfonic acid is one or multiple of alkyl sulfonic acid, naphthenic sulfonic acid, C2-C10 alkenyl sulfonic acid, C2-C10 alkynyl sulfonic acid, substituent alkyl sulfonic acid, substituent naphthenic sulfonic acid, substituent C2-C10 alkenyl sulfonic acid or substituent C2-C10 alkynyl sulfonic acid. There is no special restriction to the substituent group in the aliphatic sulfonic acid molecule and it can be alkyl, phenyl, alkoxy, carboxyl, hydroxyl or halogen, etc., preferably, alkyl, phenyl, alkoxy or halogen; more preferably, alkyl, alkoxy or halogen; further preferably, alkyl or halogen; most preferably, halogen. Preferably, aliphatic monosulfonic acid is n-alkyl sulfonic acid of C1-C10 or n-alkyl sulfonic acid of C1-C10 substituted by fluorine; more preferably, n-alkyl sulfonic acid of C1-C6 or n-alkyl sulfonic acid of C1-C6 substituted by fluorine. Above as a substituent group is preferably alkyl of C1-C4.

There are certain requirements for concentration Cg of sulfonic acid in the gas stream during solid-phase polymerization. The concentration Cg is limited to increase molecular weight of polyester if it is too low and may lead to complicated operation, cost increase, side effect and the like if it is too high. Generally, the concentration Cg of sulfonic acid catalyst in the gas stream is preferably 0.0001 mmol/L to 1 mmol/L, more preferably, 0.0005 mmol/L to 0.2 mmol/L, and further preferably, 0.001 mmol/L to 0.1 mmol/L. The concentration range mentioned above is relatively preferable to all the sulfonic acid catalysts, and the specific preferable concentration range varies along with volatility of each sulfonic acid. As to the high-volatile alkyl sulfonic acid of C1-C6 or alkyl sulfonic acid of C1-C6 substituted by fluorine, the preferable concentration Cg range in the gas stream is 0.001 mmol/L to 1 mmol/L, more preferably 0.001 mmol/L to 0.2 mmol/L, further preferably 0.005 mmol/L to 0.1 mmol/L. As to benzenesulfonic acid, para-toluenesulfonic acid or para-chlorobenzenesulfonic acid with lower volatility, the preferable concentration Cg range in the gas stream is 0.0001 mmol/L to 0.2 mmol/L, more preferably 0.0005 mmol/L to 0.1 mmol/L, further preferably 0.0005 mmol/L to 0.05 mmol/L. Besides, it is necessary to note that, the concentration Cg of sulfonic acid catalyst in the gas stream during solid-phase polymerization may remain as the same or vary along with process of the solid-phase reaction within the range mentioned above, but in whichever condition, the range above is preferable for Cg thus to obtain a faster polymerization speed.

To ensure stable and efficient conduct of solid-phase polymerization, it is further preferable as follows: the gas stream containing a sulfonic acid catalyst in more than 80% of the time during the solid-phase polymerization process; more preferably the gas stream containing a sulfonic acid catalyst during the whole solid-phase polymerization, and most preferably the gas stream containing a sulfonic acid catalyst during the whole solid-phase polymerization in a concentration range mentioned above.

There is no restriction to the source of the sulfonic acid catalyst contained in the gas stream. The sulfonic acid catalyst contained in the gas stream may be added, or derived from circulating solid-phase gas stream, or come from the upstream crystals or heating process.

In the solid-phase polymerization process, there are certain requirements to concentration Cp of sulfonic acid catalyst in the aliphatic polyester prepolymer. If concentration Cp of the sulfonic acid catalyst is too low, it will result in low catalytic activity and slow polymerization speed. If concentration Cp is too high, the polyester prepared will be colored. The concentration Cp of sulfonic acid catalyst in the aliphatic polyester prepolymer is preferably 10 mmol/L to 350 mmol/L; more preferably 20 mmol/L to 150 mmol/L; further preferably 25 mmol/L to 100 mmol/L.

Furthermore, the ratio among concentration Cg of sulfonic acid catalyst in gas stream during solid-phase polymerization process, concentration Cp of sulfonic acid in aliphatic polyester prepolymer and partition coefficient Kgp of sulfonic acid in gas stream and aliphatic polyester prepolymer at the temperature of solid-phase polymerization is very important to stable and efficient conduct of solid-phase polymerization of aliphatic polyester prepolymer.

When Cg/(CpKgp) is too small, it indicates that the sulfonic acid catalyst in the aliphatic polyester prepolymer is volatizing into gas phase quickly, and Cp will reduce sharply, thus causing drastic decrease of polymerization speed; on the other hand, when Cg/(CpKgp) is too large, it indicates that the sulfonic acid catalyst in gas stream is diffusing into the aliphatic polyester prepolymer drastically, thus causing a sharp increase of Cp and affecting the hue of the aliphatic polyester. Usually, Cg/(CpKgp) is preferably in the range represented by the formula (1), more preferably in the range represented by the formula (2) and further preferably in the range represented by the formula (3).

$$0.01 \leq \frac{Cg}{CpKgp} \leq 100. \quad (1)$$

$$0.1 \leq \frac{Cg}{CpKgp} \leq 10. \quad (2)$$

$$0.2 \leq \frac{Cg}{CpKgp} \leq 1. \quad (3)$$

The gas stream can be any inert gas stream like nitrogen gas, carbon dioxide or the like. It can be used one-time or recycled, namely, the gas stream is one-off or recyclable. However, taking cost into account, a circulating gas stream is preferred. Generally, a dehydration process should be carried out before recycling the gas to prevent a negative influence on the polymerization from water. There is no special restriction to the dehydration method, and one or multiple of methods utilizing silica gel, phosphorus pentoxide, molecular sieves or the electrolytic method are acceptable. Generally, water content in the gas stream is preferably lower than 10 ppm and further preferably lower than 3 ppm.

In the solid-phase polymerization method of aliphatic polyester, there is no special restriction to linear velocity (flow rate) of the gas stream. However, it is unfavorable for exhaustion of the by-product of polyester condensation when the linear velocity of the gas stream is too low, which further leads to a decrease of polymerization speed. On the other hand, although over-high linear velocity of the gas stream is helpful to exhaustion of the by-product, it has high requirements to the equipment, and high energy consumption results in a rapid rise in cost. Generally, linear velocity of the gas stream during solid-phase polymerization is preferably 1 cm/s to 200 cm/s, more preferably 5 cm/s to 100 cm/s.

The method has no special restriction to polyester types and can be applied to the preparation of various crystalline polyesters. A higher molecular weight could be obtained when the method is used in preparing aliphatic polyester, particularly linear aliphatic polyester.

The solid-phase polymerization method of the high molecular weight aliphatic polyesters is applicable to polymerization of all crystalline aliphatic polyesters, but considering smooth proceeding of solid-phase polymerization, certain crystallization capacity is required in the aliphatic polyester. Besides, it is unfavorable if the temperature of solid-phase polymerization is too low. On the other hand, since temperature of solid-phase polymerization should be lower than or equal to the melting point of aliphatic polyester, the melting point of the latter shouldn't be too low either. Generally, the method is applicable to the polymerization of aliphatic polyester with whose melting point over 100° C. Further, since concentration of sulfonic acid catalyst in gas stream shouldn't be too low, this method is more applicable to the preparation of crystalline aliphatic polyester with whose melting point at 100° C.-300° C.

The aliphatic polyesters are a class of macromolecular compounds formed from aliphatic monomers through ester bond connection. The compounded monomer is aliphatic dicarboxylic acid, aliphatic polybasic acid, aliphatic dihydric alcohol, aliphatic polyhydric alcohols, aliphatic hydroxy acid or aliphatic lactone. Particularly, the monomer can be aliphatic acid such as succinic acid, adipic acid, sebacic acid or fumaric acid or their derivative; it can be aliphatic dihydric alcohol or aliphatic polyhydric alcohol such as ethylene glycol, propylene glycol, butanediol, hexylene glycol, octylene glycol, neopentyl glycol, glycerol, isosorbide, trimethylolpropane, pentaerythritol, polyhydric alcohol prepared from the reaction between trimethylolpropane or pentaerythritol and ethylene oxide or propylene epoxide, diethylene glycol, tri-ethylene glycol, polyethylene glycol, polypropylene oxide or their derivative; it can be aliphatic hydroxy acid such as lactic acid, citric acid, malic acid, glycollic acid, 3-hydroxybutyric acid, 4-hydroxybutyric acid, 4-hydroxyvalerate, or 6-hydroxyhexanoic acid, or aliphatic lactone such as glycolide, lactide, ε-caprolactone, ε-caprolactoneglycolide, β-propiolactone, δ-butyrolactone, β-butyrolactone, γ-butyrolactone, pivalolactone or δ-valerolactone. Multiple monomers can be polymerized, but in consideration of the melting point and crystallinity degree, it is preferable that ratio of one or two monomers in the whole component is over 50 mol %.

In view of high molecular weight and high melting point, the aliphatic polyester is preferably resin of polylactic acids with L-lactic acid and/or D-lactic acid from the monomer units mentioned above. It is necessary to note that the polymer with L-lactic acid as the main component is called poly(L-lactic acid), and the polymer with D-lactic acid as the main component is called poly(D-lactic acid).

When the resin of polylactic acids is poly(L-lactic acid), it preferably contains over 70 mol % of L-lactic acid unit, more preferably over 80 mol %, further preferably over 90 mol %, further preferably over 95 mol % and especially preferably over 98 mol % of L-lactic acid unit.

When the resin of polylactic acids is poly(D-lactic acid), it preferably contains over 70 mol % of D-lactic acid unit, more preferably over 80 mol %, further preferably over 90 mol %, further preferably over 95 mol % and especially preferably over 98 mol % of D-lactic acid unit.

When preparing the resin of polylactic acids through direct polycondensation, the main material of 90 wt % of lactic acid aqueous solution is preferable, particularly the high-purity lactic acid with total content of impurity alcohol below 70 ppm, total content of organic acid below 800 ppm, total content of aldehydes below 50 ppm and total content of ester below 400 ppm.

Optical purity of the lactic acid used is preferably over 95%, further preferably over 98% and especially preferably over 99%. When the lactic acid is L-lactic acid, content of D-lactic acid is preferably below 2.5 mol %, more preferably below 1 mol % and especially preferably below 0.5 mol %. When the lactic acid is D-lactic acid, content of L-lactic acid is preferably below 2.5 mol %, more preferably below 1 mol % and especially preferably below 0.5 mol %.

Also, a polylactic acid stereo complex containing poly(L-lactic acid) prepolymer and poly(D-lactic acid) prepolymer or segmented copolymer prepolymer containing poly(L-lactic acid) and poly(D-lactic acid) is preferred.

Within the range of not damaging performance of the aliphatic polyester resin which is prepared therefrom, monomer units with other components may also be included such as aromatic dicarboxylic acids and polybasic carboxylic acids like terephthalic acid, isophthalic acid, 2,6-naphthalic acid, isophthalic acid-5-sodium sulfonate and sulfosophthalic acid-5-tetrabutylphosphonium and the like or their derivatives, or aromatic dihydric alcohol or polyhydric alcohols from addition reaction between bisphenol and ethylene oxide.

The solid-phase polymerization method of high molecular weight aliphatic polyester is not only applicable to the polymerization of dicarboxylic acid/dihydric alcohol polyester and also to the polymerization of polyhydroxy carboxylic acid. Further, it is also applicable to the polymerization of copolymer of dicarboxylic acid/dihydric alcohol polyester and copolymer of polyhydroxy carboxylic acid. In view of the equilibrium of hydroxyl and carboxyl groups, the method is more effective to improve weight-average molecular weight of copolymer or homopolymer of polyhydroxy carboxylic acid, especially effective to improve weight-average molecular weight of aliphatic polyester prepolymer which contains over 50 mol % of hydroxy carboxylic acid units. Due to the high melting point and crystallinity degree of polylactic acid or polyglycolic acid, the method is most effective to improve weight-average molecular weight of them. Namely, the aliphatic polyester prepolymer is further preferred as polylactic acid or polyglycolic acid, and most preferably, linear polylactic acid or linear polyglycolic acid.

The method requires certain crystallinity degree in the aliphatic polyester prepolymer before solid-phase polymerization to avoid conglutination and caking in the solid-phase system. However, there is no restriction to the preparation and crystallization methods of aliphatic polyester prepolymer. The preparation and crystallization methods of aliphatic polyester prepolymer don't substantially influence the effects. The polyester prepolymer can be obtained through solution polymerization or melt polymerization, but in view of saving energy and reducing environment stress, it is preferably prepared through melt polymerization.

There is no special restriction to the reaction condition of melt polymerization process for preparing prepolymer, and the process can be carried out in any condition. It can be conducted in one step or over two steps, or in batches or contiguously.

In view of preparing aliphatic polyester prepolymer fast and efficiently, as to the melt polymerization process, the actual reaction temperature is preferably at 120~220° C., further preferably, at 130~200° C. and especially preferably, at 140~180° C. In view of effectively preparing aliphatic polyester prepolymer with high melting point and good hue, the preparation is preferably conducted at 145~175° C., and more preferably, at 145~170° C. In addition, temperature of the melt polymerization process is one-step or multi-step (over two steps), but in view of effectively preparing polylactic acid prepolymer with high molecular weight and melting point, multiple steps (over two steps) are preferred such as the method of conducting reaction at 140~160° C. and then at 160~180° C.

Catalyst can either be added or not when preparing or processing the prepolymer. The added catalyst can be metal catalyst like stannum, titanium, antimony, zinc or manganese or acidic catalyst like sulfonic acid or sulfuric acid. However, considering thermal stability, safety and environment friendliness of the product, it is preferably not to add metal catalyst (or other metal compound assistants) when preparing or processing the prepolymer. Namely, it is preferably to use acidic catalyst like sulfonic acid or sulfuric acid in the prepolymer preparation, and sulfonic acid catalyst is further preferred from the point of hue.

In view of effectively preparing high-molecular-weight aliphatic polyester prepolymer, as to the actual reaction pressure, the melt polymerization process is preferably conducted at a pressure of 0.13~130 kPa. In view of effectively preparing aliphatic polyester prepolymer with a good hue, the melt polymerization process is further preferably conducted at a pressure of 1-100 kPa, more preferably at a pressure of 10-90 kPa, further preferably at a pressure of 10-80 kPa, especially preferably at a pressure of 20-70 kPa. Besides, the pressure for melt polymerization process is one-step or multi-step (over two steps), but in view of fast and efficient polymerization with good hue, multiple steps (over two steps) are preferred such as the method of conducting the reaction at a pressure of 13.3-66.6 kPa and then at a pressure of 1.3-6.5 kPa.

Preferably, the melt polymerization process of preparing prepolymer is conducted within a reaction period of 0.5-50 hours, and in view of effectively preparing aliphatic polyester prepolymer with a good hue, the process is preferably conducted within a reaction period of 1-45 hours, more preferably within a reaction period of 2-40 hours, further preferably within a reaction period of 3-35 hours, especially preferably within a reaction period of 4-30 hours. In addition, when temperature and pressure of the melt polymerization process are in multiple steps (over two steps), a method of conducting the process at a temperature of 140~160° C., a pressure of 13.3-66.6 kPa and within a reaction period of 2-15 hours, and then conducting it at a temperature of 160~180° C., a pressure of 1.3-6.5 kPa and within a reaction period of 2-15 hours is illustrated. It is necessary to note that even when the temperature and pressure are in multiple steps (over two steps), the total reaction time of the melt polymerization process is preferably at 0.5-50 hours.

The melt polymerization process of preparing prepolymer can be conducted in batches or contiguously. When it is conducted in batches, the time duration from room temperature to actual reaction temperature is preferably with 30% of the time for the process, more preferably, within 20%, further preferably, within 10%. In addition, the time duration from constant pressure to actual reaction pressure is preferably with 50% of the time for the process, more preferably, within 40%, further preferably, within 30%.

The melt polymerization process of preparing prepolymer can be conducted in batches or contiguously and there is no special restriction to the reaction tank. Reaction tank in types of agitator bath, mixing machine, towel reaction tank or extruder can be used, and two or more the reaction tanks can be combined and used. Besides, in view of production capacity, the melt polymerization process is preferably conducted contiguously.

Various reactors can be used in the melt polymerization process of preparing prepolymer, but in view of effectively preparing aliphatic polyester prepolymer with high molecular weight, melting point, thermal stability and good hue, the device which connects the reaction tank with a reflux device is preferred.

In the melt polymerization process of preparing prepolymer, the reaction tank may include one reaction chamber or over two reaction chambers which are divided by a baffle board, but in view of effectively preparing resin of polylactic acids with high molecular weight, a reaction with over two reaction chambers is preferred.

In the melt polymerization process of preparing prepolymer, the reflux device is preferably connected to upper part of the reaction tank, and more preferably, a vacuum pump is connected to the reflux device. It is necessary to note that the reflux device is a device for separating volatile components, any device which includes gasification parts to eliminate part of the volatile components from the reaction system and concentration parts (condensation parts) to send part of the volatile components back into the reaction system, is acceptable. In detail, any device which could remove water from the volatile components and send lactic acid and lactide or their micromolecular polymers back to the reaction tank of melt polymerization process is acceptable. A concentrator which constitutes into the concentration parts is in any type of double tubes, multiple tubes, coil, plate, plate fin, vortex or jacket.

In the melt polymerization process of preparing prepolymer, there is no special restriction to the method of taking out the generated prepolymer out the reaction tank after the reaction. Methods such as taking out the prepolymer by extruding it with inert gas like nitrogen gas, or taking out the prepolymer by a gear pump are acceptable. In view of operability of the low-viscosity micromolecular compound, the method of taking out the prepolymer by extruding it with inert gas like nitrogen gas is preferred.

There is no special restriction to the crystallization processing method of aliphatic polyester prepolymer before solid-phase polymerization. The crystallization can be conducted isothermally after temperature of the melt is lowered to a certain crystallization temperature, or the crystallization can be conducted separately for a certain time at a series of crystallization temperatures. The crystallization can be conducted in air atmosphere, nitrogen atmosphere, in gas stream or vacuum and further in water or other liquid medium. When the crystallization is carried out in gas stream, the gas stream may contain or not contain sulfonic acid catalyst. There is no special restriction to the crystallinity degree either. In view of enrichment degree of terminal group, inhibition particles or powder caking, the higher the crystallinity degree is, the better. However, over-high crystallinity degree will reduce activity of terminal group, thus lowering the polymerization speed.

Except for crystallization, there is no special restriction to other pretreatment processes (such as drying and the like) before solid-phase polymerization either. When these pretreatment processes are conducted in gas stream, the gas stream may contain or not contain sulfonic acid catalyst.

Weight average molecular weight Mw of aliphatic polyester prepolymer before solid-phase polymerization has no substantial influence to the effects, but if the weight average molecular weight Mw is too low, it will cause low melting point of the prepolymer, thereby influencing rise of temperature of the solid-phase polymerization. On the other hand, high weight average molecular weight is favorable for fast and smooth processing of solid-phase polymerization, but it has higher requirements for the preparation of aliphatic polyester prepolymer, thus causing increase of cost for prepolymer preparation. Generally, weight average molecular weight Mw of aliphatic polyester prepolymer before solid-phase polymerization is preferably 5000 to 50000, further preferably 8000 to 30000. In the solid-phase polymerization, speed of polymerization is high since the gas stream contains sulfonic acid catalyst; as a result, the increased average speed of weight average molecular weight is higher than or equivalent to 3500/h. There is no special restriction to the time duration of solid-phase polymerization in this invention. Generally, the longer the polymerization lasts, the higher weight average molecular weight can be obtained; therefore, time of polymerization usually depends on the target weight average molecular weight. The solid-phase polymerization in this invention usually lasts for 20-40 hours, and weight average molecular weight of 100,000-300,000 can be obtained; once the solid-phase polymerization is prolonged, Mw may reach 500,000, even 1,000,000.

The method has no special regulations to the temperature of solid-phase polymerization. Generally, temperature of solid-phase polymerization depends on the glass transition temperature and melting point of target aliphatic polyester, namely, temperature (Ts) of solid-phase polymerization should be between the glass transition temperature (Tg) and melting point (Tm):

$$Tg<Ts<Tm \quad (4);$$

The reaction can not proceed if the temperature of solid-phase polymerization is lower than the glass transition temperature. It will cease to be solid-phase polymerization if the temperature of solid-phase polymerization is higher than melting point. Speed of polymerization is low because of the low temperature. Generally, the polymerization temperature should be raised as much as possible under a precondition of preventing fusion of particles or powder. Under a premise that the temperature of solid-phase polymerization is higher than the glass transition temperature, it is preferably between 40° C. below the melting point and the melting point:

$$Tm-40<Ts<Tm \quad (5);$$

it is more preferably between 30° C. below the melting point and the melting point:

$$Tm-30<Ts<Tm \quad (6);$$

it is most preferably between 20° C. below the melting point and the melting point:

$$Tm-20<Ts<Tm \quad (7).$$

As to polylactic acid, its glass transition temperature Tg is 60° C. and the melting point Tm is about 170° C., therefore, the solid-phase polymerization of it is preferably at 130~170° C., more preferably, at 140~170° C., most preferably, at 150~170° C.

There is no special restriction to the subsequent treatment process of solid-phase polymerization. To promote performance of the polyester obtained, the polyester can be further treated after solid-phase polymerization. The subsequent treatment can be conducted in vacuum or gas stream. The gas stream may contain or not contain sulfonic acid when the subsequent treatment is conducted in gas stream. A particular example includes using pure gas stream without sulfonic acid catalyst or gas stream containing few sulfonic acid catalyst for devolatilization treatment on the aliphatic polyester for hours as soon as the solid-phase polymerization ends.

Various assistants can be added in the polymerization process such as stabilizer, co-catalyst, antioxidant, coloring inhibitor, nucleating agent or fire retardant and the like, and the catalyst is metal compound, nitrogen-containing compound or phosphorus-containing compound.

The metal compound can be alkali metal compound, alkaline-earth metal compound, transition metal compound, rare-earth metal compound or the compound of metal such as aluminum, gallium, indium, thallium, stannum, lead or bismuth; as specific examples, the metal compounds may include oxide, acetate or stearate and the like of lithium, potassium, barium, strontium, calcium, sodium, aluminum, titanium, manganese, samarium, zinc, chromium, gallium, ferrum, cadmium, indium, cobalt, stannum, silver, copper, molybdenum, rubidium, cesium, zirconium, vanadium or niobium and the like.

The nitrogen-containing compound can be 4-acetoxyl-2,2,6,6-tetramethyl piperidine, 4-stearoylacyloxy-2,2,6,6-tetramethyl piperidine, 4-acryloxy-2,2,6,6-tetramethyl piperidine, 4-(phenylacetoxyl)-2,2,6,6-tetramethyl piperidine, 4-benzoyloxy-2,2,6,6-tetramethyl piperidine, 4-methoxy-2,2,6,6-tetramethyl piperidine, 4-stearylacyloxy-2,2,6,6-tetramethyl piperidine, 4-cycloxyloxy-2,2,6,6-tetramethyl piperidine, 4 benzyloxy-2,2,6,6-tetramethyl piperidine, 4-phenoxy-2,2,6,6-tetramethyl piperidine, 4-(ethylaminoformyloxy)-2,2,6,6-tetramethyl piperidine, 4-(cyclohexylamidoformyloxy)-2,2,6,6-tetramethyl piperidine, 4-(benzylaminoformyloxy)-2,2,6,6-tetramethyl piperidine, bi(2,2,6,6-tetramethyl-4-piperidyl)-carbonic ester, bi(,2,6,6-tetramethyl-4-piperidyl)-oxalate, bi(2,2,6,6-tetramethyl-4-piperidyl)-malonate, bi(2,2,6,6-tetramethyl-4-piperidyl)-sebate, bi(2,2,6,6-tetramethyl-4-piperidyl)-adipate, bi(2,2,6,6-tetramethyl-4-piperidyl)-polyethylene terephthalate, 1,2-bi(2,2,6,6-tetramethyl-4-piperidyloyl)-ethane, α,α'-bi(2,2,6,6-tetramethyl-4-piperidyloyl)-para-dimethylbenzene, bi(2,2,6,6-tetramethyl-4-piperidyloyltolylene-2,4-methylenedicarbamate), bi(2,2,6,6-tetramethyl-4-piperidyl)-hexamethylene-1,6-methylenedicarbamate), tri(2,2,6,6-tetramethyl-4-piperidyl)-benzene-1,3,5-tricarboxylic ester, tri(2,2,6,6-tetramethyl-4-piperidyl)-benzene-1,3,4-tricarboxylic ester, 1-[2-{3-(3-5-di-tert-butyl-4-hydroxyphenyl)propionyloxy}butyl]-4-[3-(3,5-di-tert-butyl-4-hydroxyphenyl)propionyloxy}2,2,6,6-tetramethyl-4-piperidyl), pyrimidine, methylpyrimidine, dimethylpyrimidine, hydroxypyrimidine, aminopyrimidine, hexamethylenediamine, decamethylene diamine, trihydroxymethylaminomethane, phenylenediamine, naphthylethylenediamine, didecylamine, dihexylamine or tributylamine and the like.

The phosphorus-containing compound can be phosphoric acid, phosphonic acid, phosphinic acid, phosphate, phosphonate, phosphinate, pentaphenylphosphine or methylene trialkyl phosphine and the like.

The antioxidant can be hindered phenolic compound, phosphite ester compound or thioether compound and the like. Examples of hindered phenolic compound include n-octadecyl-3-(3',5'-di-tert-butyl-4'-hydroxyphenyl)propionate, n-octadecyl-3-(3'-methyl-5'-tertiary butyl-4'-hydroxyphenyl)propionate, n-tetradecyl-3-(3',5'-di-tert-butyl-4'-hydroxyphenyl)propionate, 1,6-hexanediol-bi-[3-(3,5-di-tert-butyl-4'-hydroxyphenyl)propionate], 1,4-butanediol-bi-[3-(3,5-di-tert-butyl-4'-hydroxyphenyl)propionate], 2,2'-methylenedi-(4-methyl-tert-butyl phenol), triethylene glycol-bi-[3-(3-tert-butyl-5-methyl-4-hydroxyphenyl)-propionate], tert [methylene-3-(3',5'-di-tert-butyl-4'-hydroxyphenyl) propionate]methane, 3,9-bi[2-{3-(3-tert-butyl-4-hydroxy-5-methyl phenyl)propionyloxy}-1,1-methyl ethyl]2,4,8,10-tert oxaspiro (5,5) undecane, N,N'-bi-3-(3',5'-di-tert-butyl-4'-hydroxyphenyl)propionylhexamethylenediamine, N,N'-tetramethylene-bi-3-(3'-methyl-5'-tert-butyl-4'-hydroxy phenol) propionyl-diamine, N,N'-tetramethylene-bi-[3-(3,5-di-tert-butyl-4'-hydroxyphenyl)propionyl]hydrazine, N-salicyloyl-N'-salicyloyl hydrazide, 3-(N-salicyloyl)amino-1,2,4-triazole, or N,N'-bi[2-{3-(3,5-di-tert-butyl-4'-hydroxyphenyl)propionyloxy}ethyl]oxyamide, etc., and triethylene glycol-bi-[3-(3-di-tert-butyl-5-methyl-4-hydroxyphenyl)-propionate] or tert[methylene-3-(3',5'-di-tert-butyl-4'-hydroxyphenyl)propionate]methane is preferred. The phosphite ester compound is preferably a compound with at least one P—O bond combined to the aromatic group and examples include tri(2,4-di-tert-butyl phenyl)phosphite ester, tert(2,4-di-tert-butyl phenyl)4,4'biphenylene phosphite ester, bi(2,4-di-tert-butyl phenyl)pentaerythritol-bi-phosphite ester, bi(2,6-di-tert-butyl-4-methyl phenyl)pentaerythritol-bi-phosphite ester, 2,2-methylenebi(4,6-di-tert-butyl-4-methyl phenyl)octyl phosphite ester, 4,4'-butylidene-bi-(3-methyl-6-tert-butyl phenyl-di-tridecyl)phosphite ester, 1,1,3-tri (2-methyl-4-ditridecyl phosphite ester-5-tert-butyl-phenyl) butane, tri(mixed mono and bi-nonyl phenol) phosphite ester, tri(nonyl phenol) phosphite ester, or 4,4'-isolidenebi(phenyl-dialkyl phosphite ester), etc., and tri(2,4-di-tert-butyl phenyl) phosphite ester, 2,2-isolidenebi(4,6-di-tert-butyl-4-methyl phenyl)octyl phosphite ester, bi(2,6-di-tert-butyl-4-methyl phenyl)pentaerythritol-bi-phosphite ester or tert(2,4-di-tert-butyl-4-methyl phenyl)4,4'-biphenylene phosphite ester and the like.

Examples of thioether compound include dilauryl thiodipropionate, di-tridecyl thiodipropionate, dimyristyl thiodipropionate, bioctadecyl thiodipropionate, pentaerythritol-tert-(3-lauryl thiopropionate), pentaerythritol-tert-(3-dodecyl thiopropionate), pentaerythritol-tert(3-octadecyl thiopropionate), pentaerythritol-tert(3-myristyl thiopropionate), or pentaerythritol-tert(3-stearoyl thiopropionate).

Examples of the optical stabilizer include diphenyl ketone compound, benzotriazole compound, aromatic benzoate compound, anilinium oxalate compound, cyanoacrylate compound or hindered amino compound. Examples of diphenyl ketone compound include diphenyl ketone, 2,4-dihydrodiphenyl ketone, 2,2',4,4'-terthydrodiphenyl ketone, 2-hydroxy-4-methoxy-diphenyl ketone, 2,2'-dyhydroxy-4,4'-dimethoxy diphenyl ketone, 2,2'-dyhydroxy diphenyl ketone, 2-hydroxy-4-octyloxy diphenyl ketone, 2-hydroxyl-4-dodecyl diphenyl ketone, 2-hydroxyl-4-methoxy-5-sulfodiphenyl ketone, 5-chlorine-2-hydroxyl diphenyl ketone, 2,2'-dihydroxyl-4,4'-dimethoxy-5-sulfodiphenyl ketone, 2-hydroxy-4-methoxy-2'-hydroxyl diphenyl ketone, or 2-hydroxyl-4-(2-hydroxyl-3-methyl-acryloxyisopropoxy diphenyl ketone and the like.

Examples of benzotriazole compound include 2-(2'-hydroxyl-5'-methyl-phenyl)-benzotriazole, 2-(2-hydroxyl-3,5-di-tert-pentyl phenyl)-2H-benzotriazole, 2-(2'-hydroxyl-3, 5'-di-tert-butyl-phenyl)benzotriazole, 2-(2'-hydroxyl-3',5'-di-tert-butyl-5'-methyl-phenyl)benzotriazole, 2-(2'-hydroxyl-3',5'-di-tert-butyl-5'-phenyl)-5-chlorine-benzotriazole, 2-(2'-hydroxyl-3',5'-di-tert-isopentyl-phenyl) benzotriazole, (2-hydroxyl-5-tert-butyl phenyl) benzotriazole, 2-[2'-hydroxyl-3',5'-bi (α,α-dimethylbenzyl) phenyl]benzotriazole, 2-[2'-hydroxyl-3',5'-bi (α,α-dimethylbenzyl)phenyl]-2H-benzotriazole, or 2-(2'-hydroxyl-4'-octoxylphenyl)benzotriazole and the like.

Examples of aromaric benzoic acid compound include alkyl phenyl salicylate such as para-tert-butyl phenyl salicylate or para-octyl phenyl salicylate and the like.

Examples of anilinium oxalate compound include 2-ethyoxyl-2'-ethyl diphenylamine oxalate, 2-ethyoxyl-5-tert-butyl-2'-ethyl diphenylamine oxalate, or 2-ethyoxyl-3'-dodecyl diphenylamine oxalate.

Examples of cyanoacrylate compound include ethyl-2-cyan-3,3'-diphenyl-acrylate, or 2-ethyl hexyl-2-cyan-3,3'-diphenyl-acrylate and the like.

Examples hindered amine compound include 4-acetoxyl-2,2,6,6-tetramethyl piperidine, 4-stearoyloxy-2,2,6,6-tetramethyl piperidine, 4-acryloxy-2,2,6,6-tetramethyl piperidine, 4-(phenyl acetoxyl)-2,2,6,6-tetramethyl piperidine, 4-benzoyloxy-2,2,6,6-tetramethyl piperidine, 4-methoxy-2, 2,6,6-tetramethyl piperidine, 4-stearoyloxy-2,2,6,6-tetramethyl piperidine, 4-cyclohexyloxy-2,2,6,6-tetramethyl piperidine, 4-benzyloxy-2,2,6,6-tetramethyl piperidine, 4-phenoxy-2,2,6,6-tetramethyl piperidine, 4-(ethyl aminomethanoyl)-2,2,6,6-tetramethyl piperidine, 4-(cyclohexyl aminomethanoyl)-2,2,6,6-tetramethyl piperidine, 4-(phenyl aminomethanoyl)-2,2,6,6-tetramethyl piperidine, bi(2,2,6,6-tetramethyl-4-piperidyl)-carbonic ester, bi(2,2,6,6-tetramethyl-4-piperidyl)-oxalate, bi(2,2,6,6-tetramethyl-4-piperidyl)-malonate, bi(2,2,6,6-tetramethyl-4-piperidyl)-sebate, bi(2,2,6,6-tetramethyl-4-piperidyl)-adipate, bi(2,2,6,6-tetramethyl-4-piperidyl)-terephthalic ester, 1,2-bi(2,2,6,6-tetramethyl-4-piperidyloxy)-ethane, α,α'-bi(2,2,6,6-tetramethyl-4-piperidyloxy)-para-dimethylbenzene, bi(2,2,6,6-tetramethyl-4-piperidyltoluoylene)2,4-diamidoformate, bi(2,2,6,6-tetramethyl-4-piperidyl)-hexamethylene-1,6-diamidoformate, tri(2,2,6,6-tetramethyl-4-piperidyl)-phenyl-1, 3,5-tricarboxylic ester, tri(2,2,6,6-tetramethyl-4-piperidyl)-phenyl-1,3,4-tricarboxylic ester, 1-[2-{3-(3,5-di-tert-butyl-4-hydroxyl phenyl)propionyloxy}-butyl]-4-[3-(3,5-di-tert-butyl-4-hydroxyl phenyl)propionyloxy]2,2,6,6-tetramethyl piperidine, or condensation compound of 1,2,3,4-butanetetracarboxylic acid and 1,2,2,6,6-pentamethyl-4-pipradrol and β,β,β',β'-tetramethyl-3,9-[2,4,8,10-tetraoxaspiro(5,5)undecane]glycol.

Compared with the prior direct method or solid-phase polymerization method, our solid-phase polymerization method of synthesizing aliphatic polyester gains advantages of faster polymerization speed and simple after-treatment process. In addition, the aliphatic polyester obtained is characterized in high molecular weight and melting point, good color and luster and prefect thermal stability. By simple after-treatment process, the sulfonic acid catalyst in the product after solid-phase polymerization can be removed easily and the final product prepared features in great hydrolysis resistance. In addition, we have one more advantage of being able to prepare product without metal ion in the method. The aliphatic polyester without metal ion can be used for common. Furthermore, compared to other polyesters containing metal, it is more suitable as high value-added medical material and packing material which contacts with food directly.

DETAILED DESCRIPTION

Our methods are further illustrated by the following examples. But the examples are not intended to limit the scope of this disclosure in any manner.

Description to the tests involved in the examples is as below:

Measuring conditions of weight-average molecular weight (Mw) and number-average molecular weight (Mn): LC solution GPC of Shimadzu Corporation, Japan, 30° C., $CHCl_3$ (or HFIP) eluent, PS (or PMMA) standard samples.

Measuring condition of melting point Tm): DSC Q-100 of U.S.TA Corporation. Based on the melting point of the product, melt the sample at 200° C. or 250° C. for 2 minutes, then cool off to 0° C. at a speed of 20° C./min and further heat up to 200° C. or 250° C. from 0° C. at a speed of 20° C./min. Tm depends on the heating curve, and its value is the top temperature of melting peak.

Measuring condition of thermal degradation rate (speed of thermal weight loss); TGA-Q100 of U.S.TA Corporation, it is measured at 200° C. isothermally in nitrogen gas stream of 100 ml/min.

Content of sulfur element in aliphatic polyester and its prepolymer is measured with combustion method-liquid ion chromatography (ISO10304), and the measuring equipment is ICS-2000(Dionex). Concentration Cp of sulfonic acid catalyst in aliphatic polyester and its prepolymer is calculated from the sulfur content, and concentration Cg of sulfonic acid in the gas stream is analyzed and measured from the sulfonic acid in the gas caught by cold trap. It is necessary to note that Cg is the concentration in a standard state of the gas stream.

Measurement of partition coefficient Kgp of sulfonic acid catalyst in gas stream and aliphatic polyester includes conducting a treatment on the gas stream which contains certain concentration Cge through aliphatic polyester particles for 30 hours and measuring concentration Cpe of sulfonic acid in the particles. The partition coefficient Kgp at the temperature is Cge/Cpe. According to the measurement, the partition coefficient Kgp of methylsulfonic acid in nitrogen gas and polylactic acid at 160° C. is 0.00145; the partition coefficient Kgp of para-toluenesulfonic acid in nitrogen gas and polylactic acid at 160° C. is 0.00006.

Linear velocity of gas stream (in a standard state) is calculated from the gas flux (in standard state), diameter of polymerization pipe and packing volume fraction of the particles.

PREPARATION OF PREPOLYMER

Preparation Example 1

Inject 200 g L-lactic acid solution (content of D-lactic acid is lower than 0.4 mol %, hereinafter inclusive) of 90 wt % into a 500 ml four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 1.5 hours at 5 KPa and add 0.108 mg stannous acetate and 1.44 g methanesulfonic acid under nitrogen gas protection; heat up the system to 160° C. and carry out melting polymerization at a pressure lower than or equivalent to 0.3 KPa for 8 hours to obtain a poly(L-lactic acid) prepolymer with Mw and Mn respectively at 12400 and 7200. Crystallize the prepolymer in a vacuum oven at 130° C. for 6 hours, then take it out for future use. Content of S element in the prepolymer measures 3429 ppm, and concentration Cp of sulfonic acid catalyst in the prepolymer calculated from content of S element is 134 mmol/L.

Preparation Example 2

Inject 1000 g L-lactic acid solution of 90 wt % into a 3 L four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa and add 14.4 g methanesulfonic acid under nitrogen gas protection; heat up the system to 160° C. and carry out melting polymerization at a pressure lower than or equivalent to 0.3 KPa for 11 hours to obtain a poly(L-lactic acid) prepolymer with Mw and Mn respectively at 10200 and 6300. Crystallize the prepolymer in a vacuum oven at 130° C. for 6 hours, then take it out for future use. Content of S element in the prepolymer measures 6667 ppm, and concentration Cp of sulfonic acid catalyst in the prepolymer calculated from content of S element is 260 mmol/L.

Preparation Example 3

Inject 200 g D-lactic acid solution (content of L-lactic acid is not higher than 0.5 mol %) of 90 wt % into a 500 ml four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 1.5 hours at 5 KPa and add 0.29 g methanesulfonic acid under nitrogen gas protection; heat up the system to 160° C. and carry out melting polymerization at a pressure lower than or equivalent to 0.3 KPa for 12 hours to obtain a poly(D-lactic acid) prepolymer with Mw and Mn respectively at 5500 and 3100. Crystallize the prepolymer in a vacuum oven at 130° C. for 6 hours, then take it out for future use. Content of S element in the prepolymer measures 681 ppm, and concentration Cp of sulfonic acid catalyst in the prepolymer calculated from content of S element is 27 mmol/L.

Preparation Example 4

Inject 200 g L-lactic acid solution of 90 wt % into a 500 ml four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 1.5 hours at 5 KPa and add 97% Sulfuric acid 0.30 g under nitrogen gas protection; heat up the system to 170° C. and carry out melting polymerization at a pressure lower than or equivalent to 0.3 KPa for 20 hours to obtain a poly(L-lactic acid) prepolymer with Mw and Mn respectively at 46300 and 26400. Crystallize the prepolymer in a vacuum oven at 130° C. for 6 hours, then take it out for future use. Content of S element in the prepolymer measures 676 ppm, and concentration Cp of sulfonic acid catalyst in the prepolymer calculated from content of S element is 26 mmol/L.

Preparation Example 5

Inject 200 g L-lactic acid solution of 90 wt % into a 500 ml four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 1.5 hours at 5 KPa and add monohydrate of para-toluenesulfonic acid 1.29 g under nitrogen gas protection; heat up the system to 180° C. and carry out melting polymerization at a pressure lower than or equivalent to 0.3 KPa for 12 hours to obtain a poly(L-lactic acid) prepolymer with Mw and Mn respectively at 22000 and 13500. Crystallize the prepolymer in a vacuum oven at 130° C. for 6 hours, then take it out for future use. Content of S element in the prepolymer measures 1530 ppm, and concentration Cp of sulfonic acid catalyst in the prepolymer calculated from content of S element is 60 mmol/L.

Preparation Example 6

Inject 155 g glycolic acid and 1.29 g monohydrate of para-toluenesulfonic acid into a 500 ml four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then reduce the pressure to 0.3 Kpa gradually within 2 hours meanwhile raising the temperature of oil bath to 190° C.; carry out melting polymerization for 12 hours to obtain polyglycolic acid prepolymer with Mw and Mn respectively at 8200 and 5100; crystallize the prepolymer in a vacuum oven at 150° C. for 6 hours, then take it out for future use. Content of S element in the prepolymer measures 1837 ppm, and concentration Cp of sulfonic acid catalyst in the prepolymer calculated from content of S element is 72 mmol/L.

Preparation Example 7

Inject 118 g succinic acid, 90 g 1,4-Butylene glycol and 0.29 g methanesulfonic acid into a 500 ml four-mouth flask, then put the flask into an oil bath. Arrange a mixer onto the four-mouth flask and insert a thermoelectric thermometer therein, connect a vacuum pipeline with a nitrogen gas pipeline and replace the gas therein with nitrogen gas for 3 times, then reduce the pressure to 0.3 Kpa gradually within 2 hours meanwhile raising the temperature of oil bath to 160° C.; carry out melting polymerization for 8 hours to obtain poly(butyl succinate) prepolymer with Mw and Mn respectively at 9600 and 6700; crystallize the prepolymer in a vacuum oven at 70-90° C. for 12 hours, then take it out for future use. Content of S element in the prepolymer measures 562 ppm, and concentration Cp of sulfonic acid catalyst in the prepolymer calculated from content of S element is 22 mmol/L.

Preparation Example 8

Mix 70 g poly(L-lactic acid) prepolymer obtained in preparation example 2 with 30 g poly(butylene succinate) obtained in preparation example 7 in nitrogen gas atmosphere at 190° C. for 10 minutes to obtain a mixed prepolymer, then crystallize it in vacuum oven at 95-130° C. for 12 hours and take it out for future use.

Preparation Example 9

Inject 500 g L-lactic acid solution of 90 wt % into a 1000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa; heat up the system to 180° C. and carry out melting polymerization at a pressure lower than or equivalent to 0.3 KPa for 72 hours to obtain 330 g poly(L-lactic acid) prepolymer with Mw at 11200. Crystallize the prepolymer in a vacuum oven at 130° C. for 6 hours, then triturate, screen and take the prepolymer particles with particle size at 1.18-3.35 mm for future use.

Preparation Example 10

Inject 500 g L-lactic acid solution of 90 wt % into a 1000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa and add 1.8 g methane sulfonic acid under nitrogen gas protection; heat up the system to 160° C. and carry out melting polymerization at a pressure lower than or equivalent to 0.3 KPa for 12 hours to obtain 350 g poly(L-lactic acid) prepolymer with Mw at 8100. Crystallize the prepolymer in a vacuum oven at 130° C. for 6 hours, then triturate, screen and take the prepolymer particles with particle size at 1.18-3.35 mm for future use. Content of S element in the prepolymer measures 1714 ppm, and concentration Cp of sulfonic acid catalyst in the prepolymer calculated from content of S element is 67 mmol/L.

Preparation Example 11

Inject 1500 g L-lactic acid solution of 90 wt % into a 3000 mL four-mouth flask, then put the flask into an oil bath. Arrange a mixer onto the four-mouth flask and insert a thermoelectric thermometer therein, connect a vacuum pipeline with a nitrogen gas pipeline and replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa and add 10.8 g methanesulfonic acid under nitrogen gas protection; heat up the system to 160° C. and carry out melting polymerization at a pressure lower than or equivalent to 0.3 KPa for 12 hours to obtain 1065 g poly(L-lactic acid) prepolymer with Mw at 21200. Crystallize the prepolymer in a vacuum oven at 130° C. for 6 hours, then triturate, screen and take the prepolymer particles with particle size at 1.18-3.35 mm for future use. Content of S element in the prepolymer measures 3380 ppm, and concentration Cp of sulfonic acid catalyst in the prepolymer calculated from content of S element is 132 mmol/L.

Preparation Example 12

Inject 500 g L-lactic acid solution of 90 wt % into a 1000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa and add 9.59 g methanesulfonic acid under nitrogen gas protection; heat up the system to 160° C. and carry out melting polymerization at a pressure lower than or equivalent to 0.3 KPa for 8 hours to obtain 357 g poly(L-lactic acid) prepolymer with Mw at 28500. Crystallize the prepolymer in a vacuum oven at 130° C. for 6 hours, then triturate, screen and take the prepolymer particles with particle size at 1.18-3.35 mm for future use. Content of S element in the prepolymer measures 8950 ppm, and concentration Cp of sulfonic acid catalyst in the prepolymer calculated from content of S element is 350 mmol/L.

Preparation Example 13

Inject 500 g L-lactic acid solution of 90 wt % into a 1000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa and add 11.0 g methanesulfonic acid under nitrogen gas protection; heat up the system to 160° C. and carry out melting polymerization at a pressure lower than or equivalent to 0.3 KPa for 6 hours to obtain 357 g poly(L-lactic acid) prepolymer with Mw at 23400. Crystallize the prepolymer in a vacuum oven at 130° C. for 6 hours, then triturate, screen and take the prepolymer particles with particle size at 1.18-3.35 mm for future use. Content of S element in the prepolymer measures 10270 ppm, and concentration Cp of sulfonic acid catalyst in the prepolymer calculated from content of S element is 401 mmol/L.

Preparation Example 14

Inject 1500 g L-lactic acid solution of 90 wt % into a 3000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa and add 7.52 g monohydrate of para-toluenesulfonic acid under nitrogen gas protection; heat up the system to 170° C. and carry out melting polymerization at a pressure lower than or equivalent to 0.3 KPa for 16 hours to obtain 1056 g poly (L-lactic acid) prepolymer with Mw at 22000. Crystallize the prepolymer in a vacuum oven at 130° C. for 6 hours, then triturate, screen and take the prepolymer particles with particle size at 1.18-3.35 mm for future use. Content of S element in the prepolymer measures 1208 ppm, and concentration Cp of sulfonic acid catalyst in the prepolymer calculated from content of S element is 47 mmol/L.

Preparation Example 15

Inject 500 g L-lactic acid solution of 90 wt % into a 1000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa and add 1.25 g monohydrate of para-toluenesulfonic acid under nitrogen gas protection; heat up the system to 170° C. and carry out melting polymerization at a pressure lower than or equivalent to 0.3 KPa for 24 hours to obtain 352 g poly(L-lactic acid) prepolymer with Mw at 12000. Crystallize the prepolymer in a vacuum oven at 130° C. for 6 hours, then triturate, screen and take the prepolymer particles with particle size at 1.18-3.35 mm for future use. Content of S element in the prepolymer measures 601 ppm, and concentration Cp of sulfonic acid catalyst in the prepolymer calculated from content of S element is 23 mmol/L.

Preparation Example 16

Inject 1500 g L-lactic acid solution of 90 wt % into a 3000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa and add 10.8 g monohydrate of para-toluenesulfonic acid under nitrogen gas protection; heat up the system to 170° C. and carry out melting polymerization at a pressure lower than or equivalent to 0.3 KPa for 10 hours to obtain 1065 g poly (L-lactic acid) polymer with Mw at 11000. Crystallize the prepolymer in a vacuum oven at 130° C. for 6 hours, then triturate, screen and take the prepolymer particles with particle size at 1.18-3.35 mm for future use. Content of S element in the prepolymer measures 1708 ppm, and concentration Cp of sulfonic acid catalyst in the prepolymer calculated from content of S element is 67 mmol/L.

Preparation Example 17

Inject 500 g L-lactic acid solution of 90 wt % into a 1000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa and add 3.46 g p-octylbenzenesulfonic acid under nitrogen gas protection; heat up the system to 170° C. and carry out melting polymerization at a pressure lower than or equivalent to 0.3 KPa for 12 hours to obtain 354 g poly(L-lactic acid) prepolymer with Mw at 12000. Crystallize the prepolymer in a vacuum oven at 130° C. for 6 hours, then triturate, screen and take the prepolymer particles with particle size at 1.18-3.35 mm for future use. Content of S element in the prepolymer measures 1100 ppm, and concentration Cp of sulfonic acid catalyst in the prepolymer calculated from content of S element is 43 mmol/L.

Preparation Example 18

Inject 500 g L-lactic acid solution of 90 wt % into a 1000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa and add 2.58 g 4-Chlorobenzenesulfonic acid under nitrogen gas protection; heat up the system to 170° C. and carry out melting polymerization at a pressure lower than or equivalent to 0.3 KPa for 12 hours to obtain 356 g poly(L-lactic acid) prepolymer with Mw at 13000. Crystallize the prepolymer in a vacuum oven at 130° C. for 6 hours, then triturate, screen and take the prepolymer particles with particle size at 1.18-3.35 mm for future use. Content of S element in the prepolymer measures 1200 ppm, and concentration Cp of sulfonic acid catalyst in the prepolymer calculated from content of S element is 47 mmol/L.

Preparation Example 19

Inject 500 g L-lactic acid solution of 90 wt % into a 1000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times, then raise the temperature of oil bath to 120° C. for dehydration. Reduce the constant pressure in the system to 5 KPa gradually within 60 minutes since the dehydration begins; keep dehydrating for 2.5 hours at 5 KPa and add 8.96 g (Perfluorohexyl) sulfonic acid under nitrogen gas protection; heat up the system to 170° C. and carry out melting polymerization at a pressure lower than or equivalent to 0.3 KPa for 12 hours to obtain 355 g poly(L-lactic acid) prepolymer with Mw at 15000. Crystallize the prepolymer in a vacuum oven at 130° C. for 6 hours, then triturate, screen and take the prepolymer particles with particle size at 1.18-3.35 mm for future use. Content of S element in the prepolymer measures 2020 ppm, and concentration Cp of sulfonic acid catalyst in the prepolymer calculated from content of S element is 79 mmol/L.

Preparation Example 20

Inject 400 g L-lactic acid solution of 88 wt % and 3.11 g monohydrate of para-toluenesulfonic acid into a 1000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times; raise the temperature of oil bath to 100° C. from room temperature in nitrogen gas stream for 30 minutes and then raise the temperature to 160° C. for 1 hour and maintain the temperature for 1 hour. Reduce the pressure to 13.3 KPa gradually within 2 hours, maintain the pressure and carry out melting polymerization at 160° C. for 8 hours to obtain 267 g poly(L-lactic acid)prepolymer melt with Mw at 13000. Pour the melt into a tetrafluoroethylene plate when it is in molten state, cool it off, triturate, screen and take the prepolymer particles with particle size at 0.5-2.0 mm for future use. Content of S element in the prepolymer particles measures 1962 ppm, and concentration Cp of sulfonic acid catalyst in the prepolymer calculated from content of S element is 77 mmol/L.

Preparation Example 21

Inject 400 g L-lactic acid solution of 88 wt % and 2.82 g methanesulfonic acid into a 1000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times; raise the temperature of oil bath to 100° C. from room temperature in nitrogen gas stream for 30 minutes and then raise the temperature to 160° C. for 1 hour and maintain the temperature for 1 hour. Reduce the pressure to 13.3 KPa gradually within 2 hours, maintain the pressure and carry out melting polymerization at 160° C. for 8 hours to obtain 268 g poly(L-lactic acid) prepolymer melt. Pour the melt into a tetrafluoroethylene plate when it is in molten state, cool it off, triturate, screen and take the prepolymer particles with particle size at 0.5-2.0 mm for future use. With Mw of prepolymer at 13000, content of S element in the prepolymer particles measures 3507 ppm, and concentration Cp of sulfonic acid catalyst in the prepolymer calculated from content of S element is 137 mmol/L.

Preparation Example 22

Inject 208.58 g L-lactic acid solution of 90 wt % and 1.05 g methanesulfonic acid into a 1000 mL four-mouth flask, then put the flask into an oil bath. Arrange a mixer onto the four-mouth flask and insert a thermoelectric thermometer therein, connect a vacuum pipeline and a nitrogen gas pipeline and then replace the gas therein with nitrogen gas for 3 times; in nitrogen gas stream at 140° C., dehydrate 1 hour, then reduce the pressure to 6.7 KPa to react for 5 hours. Adding 0.18 g sodium sulfite, mixing uniformity (10 min) to obtain 146 g poly(L-lactic acid) prepolymer melt. Pour the melt into a tetrafluoroethylene plate when it is in molten state, cool it off, triturate, screen and take the prepolymer particles with particle size at 0.5-2.0 mm for future use. With Mw of prepolymer at 9000, content of S element in the prepolymer particles measures 2397 ppm, and concentration Cp of sulfonic acid catalyst in the prepolymer calculated from content of S element is 94 mmol/L.

Example A1

Put 20 g poly(L-lactic acid) prepolymer particles obtained in Preparation example 1 into a solid-phase polymerization tower, inject nitrogen gas which contains 0.06 mmol/L of methanesulfonic acid (water content in the nitrogen gas is lower than 3 ppm, hereinafter inclusive) into the tower at a flux rate of 100 L/h, then conduct solid-phase polymerization at 160° C. for 30 hours to obtain white poly(L-lactic acid) product. Main performances of the product are as below: weight-average molecular weight Mw: 223,000; melting point Tm: 171° C.; thermal degradation rate: 0.383 wt %/min.

Example A2

Put 20 g poly(L-lactic acid) prepolymer particles obtained in Preparation example 2 into a solid-phase polymerization tower, inject nitrogen gas which contains 0.06 mmol/L of methanesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 237,000; melting point Tm: 172° C.; thermal degradation rate: 0.003 wt %/min.

Example A3

Put 20 g poly(D-lactic acid) prepolymer particles obtained in Preparation example 3 into a solid-phase polymerization tower, inject nitrogen gas which contains 0.06 mmol/L of methanesulfonic acid into the tower at a flux rate of 100 L/h, then conduct solid-phase polymerization at 160° C. for 30 hours to obtain white poly(D-lactic acid) product. Main performances of the product are as below: weight-average molecular weight Mw: 203,000; melting point Tm: 171° C.; thermal degradation rate: 0.002 wt %/min.

Example A4

Put 20 g poly(L-lactic acid) prepolymer particles obtained in Preparation example 2 into a solid-phase polymerization tower, inject nitrogen gas which contains 0.06 mmol/L of methanesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 175,000; melting point Tm: 170° C.; thermal degradation rate: 0.006 wt %/min.

Example A5

Put 20 g poly(L-lactic acid) prepolymer particles obtained in Preparation example 2 into a solid-phase polymerization tower, inject nitrogen gas which contains 0.06 mmol/L of methanesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 186,000; melting point Tm: 171° C.; thermal degradation rate: 0.004 wt %/min.

Example A6

Put 20 g polyglycolic acid prepolymer particles obtained in Preparation example 6 into a solid-phase polymerization tower, inject nitrogen gas which contains 0.06 mmol/L of methanesulfonic acid into the tower at a flux rate of 100 L/h, then conduct solid-phase polymerization at 190° C. for 30 hours to obtain white polyglycolic acid product. Main performances of the product are as below: weight-average molecular weight Mw: 95,000; melting point Tm: 218° C.

Example A7

Put 20 g poly(butylene succinate) prepolymer particles obtained in Preparation example 7 into a solid-phase polymerization tower, inject nitrogen gas which contains 0.06 mmol/L of trifluoromethanesulfonic acid into the tower at a flux rate of 100 L/h, then conduct solid-phase polymerization at 100° C. for 30 hours to obtain white poly(butylene succinate) product. Main performances of the product are as below: weight-average molecular weight Mw: 86,000; melting point Tm: 118° C.

Example A8

Put 20 g prepolymer particles obtained in Preparation example 8 into a solid-phase polymerization tower, inject nitrogen gas which contains 0.06 mmol/L of methanesulfonic acid into the tower at a flux rate of 100 L/h, then conduct solid-phase polymerization at 150° C. for 30 hours to obtain white polyester product. Main performances of the product are as below: weight-average molecular weight Mw: 127,000; melting point Tm: 165° C.

Example A9

Put 20 g poly(L-lactic acid) prepolymer particles obtained in Preparation example 9 into a solid-phase polymerization tower, inject nitrogen gas which contains 0.06 mmol/L of methanesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 227,000; melting point Tm: 174° C.; thermal degradation rate: 0.002 wt %/min.

Example A10

Put 20 g poly(L-lactic acid) prepolymer particles obtained in Preparation example 2 into a solid-phase polymerization tower, inject nitrogen gas which contains 0.0002 mmol/L of methanesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 105,000; melting point Tm: 169° C.; thermal degradation rate: 0.001 wt %/min.

Example A11

Put 20 g poly(L-lactic acid) prepolymer particles obtained in Preparation example 2 into a solid-phase polymerization tower, inject nitrogen gas which contains 0.0005 mmol/L of methanesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 125,000; melting point Tm: 169° C.; thermal degradation rate: 0.001 wt %/min.

Example A12

Put 20 g poly(L-lactic acid) prepolymer particles obtained in Preparation example 2 into a solid-phase polymerization tower, inject nitrogen gas which contains 0.001 mmol/L of methanesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 133,000; melting point Tm: 170° C.; thermal degradation rate: 0.002 wt %/min.

Example A13

Put 20 g poly(L-lactic acid) prepolymer particles obtained in Preparation example 2 into a solid-phase polymerization tower, inject nitrogen gas which contains 0.020 mmol/L of methanesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 157,000; melting point Tm: 171° C.; thermal degradation rate: 0.002 wt %/min.

Example A14

Put 20 g poly(L-lactic acid) prepolymer particles obtained in Preparation example 2 into a solid-phase polymerization tower, inject nitrogen gas which contains 0.100 mmol/L of methanesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 257,000; melting point Tm: 174° C.; thermal degradation rate: 0.003 wt %/min.

Example A15

Put 20 g poly(L-lactic acid) prepolymer particles obtained in Preparation example 2 into a solid-phase polymerization tower, inject nitrogen gas which contains 0.200 mmol/L of trifluoro-methanesulfonic acid into the tower at a flux rate of 100 L/h, then conduct solid-phase polymerization at 160° C. for 30 hours to obtain glay-white poly(L-lactic acid) product. Main performances of the product are as below: weight-average molecular weight Mw: 307,000; melting point Tm: 173° C.; thermal degradation rate: 0.002 wt %/min.

Example A16

Put 20 g poly(L-lactic acid) prepolymer particles obtained in Preparation example 2 into a solid-phase polymerization tower, inject nitrogen gas which contains 0.800 mmol/L of trifluoro-methanesulfonic acid into the tower at a flux rate of 100 L/h, then conduct solid-phase polymerization at 160° C. for 30 hours to obtain glay poly(L-lactic acid) product. Main performances of the product are as below: weight-average molecular weight Mw: 387,000; melting point Tm: 174° C.; thermal degradation rate: 0.002 wt %/min.

Example A17

Put 20 g poly(L-lactic acid) prepolymer particles obtained in Preparation example 2 into a solid-phase polymerization tower, inject carbon dioxide gas which contains 0.06 mmol/L of methanesulfonic acid into the tower at a flux rate of 100 L/h, then conduct solid-phase polymerization at 160° C. for 30 hours to obtain gray poly(L-lactic acid) product. Main performances of the product are as below: weight-average molecular weight Mw: 227,000; melting point Tm: 172° C.; thermal degradation rate: 0.001 wt %/min.

Example A18

Put 20 g poly(L-lactic acid) prepolymer particles obtained in Preparation example 2 into a solid-phase polymerization tower, inject nitrogen gas which contains 0.030 mmol/L of methanesulfonic acid and 0.030 mmol/L of ethylene sulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 249,000; melting point Tm: 172° C.; thermal degradation rate: 0.002 wt %/min.

Example A19

Put 20 g poly(L-lactic acid) prepolymer particles obtained in Preparation example 2 into a solid-phase polymerization tower, inject nitrogen gas which contains 0.060 mmol/L of propane sulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 235,000; melting point Tm: 173° C.; thermal degradation rate: 0.002 wt %/min.

Example A20

Put 20 g poly(L-lactic acid) prepolymer particles obtained in Preparation example 2 into a solid-phase polymerization tower, inject nitrogen gas which contains 0.060 mmol/L of p-toluenesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 187,000; melting point Tm: 171° C.; thermal degradation rate: 0.003 wt %/min.

Example A21

Put 20 g poly(L-lactic acid) prepolymer particles obtained in Preparation example 2 into a solid-phase polymerization tower, inject nitrogen gas which contains 0.010 mmol/L of p-octylbenzenesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 144,000; melting point Tm: 170° C.; thermal degradation rate: 0.002 wt %/min.

Example A22

Put 20 g poly(L-lactic acid) prepolymer particles obtained in Preparation example 2 into a solid-phase polymerization tower, inject nitrogen gas which contains 0.06 mmol/L of 4-chlorobenzenesulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 197,000; melting point Tm: 172° C.; thermal degradation rate: 0.001 wt %/min.

Example A23

Put 20 g poly(L-lactic acid) prepolymer particles obtained in Preparation example 2 into a solid-phase polymerization tower, inject nitrogen gas which contains 0.06 mmol/L of (Perfluorohexyl) sulfonic acid into the tower at a flux rate of 100 L/h, then conduct solid-phase polymerization at 160° C. for 30 hours to obtain white poly(L-lactic acid) product. Main performances of the product are as below: weight-average molecular weight Mw: 224,000; melting point Tm: 173° C.; thermal degradation rate: 0.002 wt %/min.

Example B1

Put 5 g poly(L-lactic acid) prepolymer particles obtained in Preparation example 9 into a solid-phase polymerization pipe with whose diameter at 1 cm, inject nitrogen gas with methanesulfonic acid concentration Cg at 0.046 mmol/L (water content in the nitrogen gas is lower than or equivalent to 3 ppm, hereinafter inclusive; linear velocity v of nitrogen gas at the particle filling part in the solid-phase polymerization pipe is 40 cm/s, hereinafter inclusive) into the pipe at a flux rate of 50 L/h, then conduct solid-phase polymerization at 160° C. for 30 hours to obtain white poly(L-lactic acid) product with weight-average molecular weight Mw at 156,000. Content of S element in the poly(L-lactic acid) product measures 450 ppm, namely, concentration of sulfonic acid catalyst in the product is about 18 mmol/L.

Example B2

Put 5 g poly(L-lactic acid) prepolymer (Cp=67 mmol/L) particles obtained in Preparation example 10 into a solid-phase polymerization pipe with whose diameter at 1 cm, inject nitrogen gas with methanesulfonic acid concentration Cg at 0.046 mmol/L (linear velocity v=40 cm/s) into the pipe at a flux rate of 50 L/h, then conduct solid-phase polymerization at 160° C. for 30 hours to obtain white poly(L-lactic acid) product with weight-average molecular weight Mw at 177,000. Concentration Cp of sulfonic acid catalyst in poly(L-lactic acid) product measures 31 mmol/L, indicating that Cg/(CpKgp) during the whole solid-phase polymerization is between 0.47 and 1.0.

Example B3

Put 5 g poly(L-lactic acid) prepolymer (Cp=132 mmol/L) particles obtained in Preparation example 11 into a solid-phase polymerization pipe with whose diameter at 1 cm, inject nitrogen gas with methanesulfonic acid concentration Cg at 0.046 mmol/L (linear velocity v=40 cm/s) into the pipe at a flux rate of 50 L/h, then conduct solid-phase polymerization at 160° C. for 30 hours to obtain white poly(L-lactic acid) product with weight-average molecular weight Mw at 193,000. Concentration Cp of sulfonic acid catalyst in poly(L-lactic acid) product measures 32 mmol/L, indicating that Cg/(CpKgp) during the whole solid-phase polymerization is between 0.24 and 1.0.

Example B4

Put 5 g poly(L-lactic acid) prepolymer (Cp=350 mmol/L) particles obtained in Preparation example 12 into a solid-phase polymerization pipe with whose diameter at 1 cm, inject nitrogen gas with methanesulfonic acid concentration Cg at 0.046 mmol/L (linear velocity v=40 cm/s) into the pipe at a flux rate of 50 L/h, then conduct solid-phase polymerization at 160° C. for 30 hours to obtain white poly(L-lactic acid) product with weight-average molecular weight Mw at 184,000. Concentration Cp of sulfonic acid catalyst in poly(L-lactic acid) product measures 33 mmol/L, indicating that Cg/(CpKgp) during the whole solid-phase polymerization is between 0.09 and 0.96.

Example B5

Put 5 g poly(L-lactic acid) prepolymer (Cp=401 mmol/L) particles obtained in Preparation example 13 into a solid-phase polymerization pipe with whose diameter at 1 cm, inject nitrogen gas with methanesulfonic acid concentration Cg at 0.046 mmol/L (linear velocity v=40 cm/s) into the pipe at a flux rate of 50 L/h, then conduct solid-phase polymerization at 160° C. for 30 hours to obtain white poly(L-lactic acid) product with weight-average molecular weight Mw at 181,000. Concentration Cp of sulfonic acid catalyst in poly(L-lactic acid) product measures 34 mmol/L, indicating that Cg/(CpKgp) during the whole solid-phase polymerization is between 0.08 and 0.92.

Example B6

Put 5 g poly(L-lactic acid) prepolymer (Cp=47 mmol/L) particles obtained in Preparation example 14 into a solid-phase polymerization pipe with whose diameter at 1 cm, inject nitrogen gas with p-toluenesulfonic acid concentration Cg at 0.002 mmol/L (linear velocity v=40 cm/s) into the pipe at a flux rate of 50 L/h, then conduct solid-phase polymerization at 160° C. for 30 hours to obtain white poly(L-lactic acid) product with weight-average molecular weight Mw at 178,000. Concentration Cp of sulfonic acid catalyst in poly(L-lactic acid) product measures 37 mmol/L, indicating that Cg/(CpKgp) during the whole solid-phase polymerization is between 0.77 and 1.0.

Example B7

Put 5 g poly(L-lactic acid) prepolymer (Cp=23 mmol/L) particles obtained in Preparation example 15 into a solid-phase polymerization pipe with whose diameter at 1 cm, inject nitrogen gas with p-toluenesulfonic acid concentration Cg at 0.002 mmol/L (linear velocity v=40 cm/s) into the pipe at a flux rate of 50 L/h, then conduct solid-phase polymerization at 160° C. for 30 hours to obtain white poly(L-lactic acid) product with weight-average molecular weight Mw at 201,000. Concentration Cp of sulfonic acid catalyst in poly(L-lactic acid) product measures 35 mmol/L, indicating that Cg/(CpKgp) during the whole solid-phase polymerization is between 1.5 and 1.0.

Example B8

Put 5 g poly(L-lactic acid) prepolymer (Cp=67 mmol/L) particles obtained in Preparation example 16 into a solid-phase polymerization pipe with whose diameter at 1 cm, inject nitrogen gas with p-toluenesulfonic acid concentration Cg at 0.002 mmol/L (linear velocity v=80 cm/s) into the pipe at a flux rate of 100 L/h, then conduct solid-phase polymerization at 160° C. for 30 hours to obtain white poly(L-lactic acid) product with weight-average molecular weight Mw at 166,000. Concentration Cp of sulfonic acid catalyst in poly(L-lactic acid) product measures 50 mmol/L, indicating that Cg/(CpKgp) during the whole solid-phase polymerization is between 0.54 and 0.72.

Example B9

Put 5 g poly(L-lactic acid) prepolymer (Cp=132 mmol/L) particles obtained in Preparation example 11 into a solid-phase polymerization pipe with whose diameter at 1 cm, inject nitrogen gas with methanesulfonic acid concentration Cg at 0.06 mmol/L (linear velocity v=80 cm/s) into the pipe at a flux rate of 100 L/h, then conduct solid-phase polymerization at 160° C. for 30 hours to obtain white poly(L-lactic acid) product with weight-average molecular weight Mw at 171,000. Concentration Cp of sulfonic acid catalyst in poly(L-lactic acid) product measures 41 mmol/L, indicating that Cg/(CpKgp) during the whole solid-phase polymerization is between 0.3 and 1.0.

Example B10

Put 5 g poly(L-lactic acid) prepolymer (Cp=132 mmol/L) particles obtained in Preparation example 11 into a solid-phase polymerization pipe with whose diameter at 1 cm, inject nitrogen gas with methanesulfonic acid concentration Cg at 0.1 mmol/L (linear velocity v=80 cm/s) into the pipe at a flux rate of 100 L/h, then conduct solid-phase polymerization at 160° C. for 30 hours to obtain canary yellow poly(L-lactic acid) product with weight-average molecular weight Mw at 153,000. Concentration Cp of sulfonic acid catalyst in poly(L-lactic acid) product measures 66 mmol/L, indicating that Cg/(CpKgp) during the whole solid-phase polymerization is between 0.52 and 1.0.

Example B11

Put 5 g poly(L-lactic acid) prepolymer (Cp=132 mmol/L) particles obtained in Preparation example 11 into a solid-phase polymerization pipe with whose diameter at 1 cm, inject nitrogen gas with methanesulfonic acid concentration Cg at 0.2 mmol/L (linear velocity v=80 cm/s) into the pipe at a flux rate of 100 L/h, then conduct solid-phase polymerization at 160° C. for 30 hours to obtain coffee-colored poly(L-lactic acid) product with weight-average molecular weight Mw at 149,000. Concentration Cp of sulfonic acid catalyst in poly(L-lactic acid) product measures 135 mmol/L, indicating that Cg/(CpKgp) during the whole solid-phase polymerization is between 1.1 and 1.0.

Example B12

Put 5 g poly(L-lactic acid) prepolymer (Cp=132 mmol/L) particles obtained in Preparation example 11 into a solid-phase polymerization pipe with whose diameter at 1 cm, inject nitrogen gas with methanesulfonic acid concentration Cg at 0.4 mmol/L (linear velocity v=80 cm/s) into the pipe at a flux rate of 100 L/h, then conduct solid-phase polymerization at 160° C. for 30 hours to obtain black-colored poly(L-lactic acid) product with weight-average molecular weight Mw at 132,000. Concentration Cp of sulfonic acid catalyst in poly(L-lactic acid) product measures 242 mmol/L, indicating that Cg/(CpKgp) during the whole solid-phase polymerization is between 2.1 and 1.1.

Example B13

Put 5 g poly(L-lactic acid) prepolymer (Cp=67 mmol/L) particles obtained in Preparation example 16 into a solid-phase polymerization pipe with whose diameter at 1 cm, inject nitrogen gas with para-toluenesulfonic acid concentration Cg at 0.00005 mmol/L (linear velocity v=40 cm/s) into the pipe at a flux rate of 50 L/h, then conduct solid-phase polymerization at 160° C. for 30 hours to obtain white poly (L-lactic acid) product with weight-average molecular weight Mw at 113,000. Concentration Cp of sulfonic acid catalyst in poly(L-lactic acid) product measures 10 mmol/L, indicating that Cg/(CpKgp) during the whole solid-phase polymerization is between 0.01 and 0.09.

Example B14

Put 5 g poly(L-lactic acid) prepolymer (Cp=67 mmol/L) particles obtained in Preparation example 16 into a solid-phase polymerization pipe with whose diameter at 1 cm, inject nitrogen gas with para-toluenesulfonic acid concentration Cg at 0.0001 mmol/L (linear velocity v=40 cm/s) into the pipe at a flux rate of 50 L/h, then conduct solid-phase polymerization at 160° C. for 30 hours to obtain white poly(L-lactic acid) product with weight-average molecular weight Mw at 139,000. Concentration Cp of sulfonic acid catalyst in poly(L-lactic acid) product measures 12 mmol/L, indicating that Cg/(CpKgp) during the whole solid-phase polymerization is between 0.03 and 0.15.

Example B15

Put 5 g poly(L-lactic acid) prepolymer (Cp=67 mmol/L) particles obtained in Preparation example 16 into a solid-phase polymerization pipe with whose diameter at 1 cm, inject nitrogen gas with para-toluenesulfonic acid concentration Cg at 0.00025 mmol/L (linear velocity v=80 cm/s) into the pipe at a flux rate of 100 L/h, then conduct solid-phase polymerization at 160° C. for 30 hours to obtain white poly (L-lactic acid) product with weight-average molecular weight Mw at 156,000. Concentration Cp of sulfonic acid catalyst in poly(L-lactic acid) product measures 21 mmol/L, indicating that Cg/(CpKgp) during the whole solid-phase polymerization is between 0.07 and 0.21.

Example B16

Put 5 g poly(L-lactic acid) prepolymer (Cp=67 mmol/L) particles obtained in Preparation example 16 into a solid-phase polymerization pipe with whose diameter at 1 cm, inject nitrogen gas with para-toluenesulfonic acid concentration Cg at 0.001 mmol/L (linear velocity v=80 cm/s) into the pipe at a flux rate of 100 L/h, then conduct solid-phase polymerization at 160° C. for 30 hours to obtain white poly(L-lactic acid) product with weight-average molecular weight Mw at 238,000. Concentration Cp of sulfonic acid catalyst in poly(L-lactic acid) product measures 28 mmol/L, indicating that Cg/(CpKgp) during the whole solid-phase polymerization is between 0.27 and 0.64.

Example B17

Put 5 g poly(L-lactic acid) prepolymer (Cp=47 mmol/L) particles obtained in Preparation example 14 into a solid-phase polymerization pipe with whose diameter at 1 cm, inject nitrogen gas with para-toluenesulfonic acid concentration Cg at 0.005 mmol/L (linear velocity v=80 cm/s) into the pipe at a flux rate of 100 L/h, then conduct solid-phase polymerization at 160° C. for 30 hours to obtain white poly(L-lactic acid) product with weight-average molecular weight Mw at 176,000. Concentration Cp of sulfonic acid catalyst in poly(L-lactic acid) product measures 49 mmol/L, indicating that Cg/(CpKgp) during the whole solid-phase polymerization is between 1.9 and 1.8.

Example B18

Put 5 g poly(L-lactic acid) prepolymer (Cp=47 mmol/L) particles obtained in Preparation example 14 into a solid-phase polymerization pipe with whose diameter at 1 cm, inject nitrogen gas with para-toluenesulfonic acid concentration Cg at 0.01 mmol/L (linear velocity v=80 cm/s) into the pipe at a flux rate of 100 L/h, then conduct solid-phase polymerization at 160° C. for 30 hours to obtain white poly(L-lactic acid) product with weight-average molecular weight Mw at 169,000. Concentration Cp of sulfonic acid catalyst in poly(L-lactic acid) product measures 54 mmol/L, indicating that Cg/(CpKgp) during the whole solid-phase polymerization is between 3.8 and 3.3.

Example B19

Put 5 g poly(L-lactic acid) prepolymer (Cp=47 mmol/L) particles obtained in Preparation example 14 into a solid-phase polymerization pipe with whose diameter at 1 cm, inject nitrogen gas with para-toluenesulfonic acid concentration Cg at 0.02 mmol/L (linear velocity v=80 cm/s) into the pipe at a flux rate of 100 L/h, then conduct solid-phase polymerization at 160° C. for 30 hours to obtain white poly(L-lactic acid) product with weight-average molecular weight Mw at 158,000. Concentration Cp of sulfonic acid catalyst in poly(L-lactic acid) product measures 57 mmol/L, indicating that Cg/(CpKgp) during the whole solid-phase polymerization is between 7.7 and 6.3.

Example B20

Put 5 g poly(L-lactic acid) prepolymer particles obtained in Preparation example 17 into a solid-phase polymerization pipe with whose diameter at 1 cm, inject nitrogen gas with para-octylbenzenesulfonic acid concentration Cg at 0.0002 mmol/L (linear velocity v=80 cm/s) into the pipe at a flux rate of 100 L/h, then conduct solid-phase polymerization at 160° C. for 30 hours to obtain white poly(L-lactic acid) product with weight-average molecular weight Mw at 157,000.

Example B21

Put 5 g poly(L-lactic acid) prepolymer particles obtained in Preparation example 18 into a solid-phase polymerization pipe with whose diameter at 1 cm, inject nitrogen gas with para-chlorobenzenesulfonic acid concentration Cg at 0.002 mmol/L (linear velocity v=80 cm/s) into the pipe at a flux rate of 100 L/h, then conduct solid-phase polymerization at 160° C. for 30 hours to obtain white poly(L-lactic acid) product with weight-average molecular weight Mw at 176,000.

Example B22

Put 5 g poly(L-lactic acid) prepolymer particles obtained in Preparation example 19 into a solid-phase polymerization pipe with whose diameter at 1 cm, inject nitrogen gas with perfluorohexylsulfonic acid concentration Cg at 0.046 mmol/L (linear velocity v=80 cm/s) into the pipe at a flux rate of 100 L/h, then conduct solid-phase polymerization at 160° C. for 30 hours to obtain gray poly(L-lactic acid) product with weight-average molecular weight Mw at 187,000.

Example B23

Put 5 g polyglycolic acid prepolymer particles obtained in Preparation example 6 into a solid-phase polymerization pipe with whose diameter at 1 cm, inject nitrogen gas with para-toluenesulfonic acid concentration Cg at 0.005 mmol/L (linear velocity v=20 cm/s) into the pipe at a flux rate of 25 L/h, then conduct solid-phase polymerization at 190° C. for 30 hours to obtain white polyglycolic acid product with weight-average molecular weight Mw at 93,000.

Example B24

Put 5 g polybuthylenesuccinate prepolymer particles obtained in Preparation example 7 into a solid-phase polymerization pipe with whose diameter at 1 cm, inject nitrogen gas with methanesulfonic acid concentration Cg at 0.015 mmol/L (linear velocity v=40 cm/s) into the pipe at a flux rate of 25 L/h, then conduct solid-phase polymerization at 100° C. for 30 hours to obtain white polybuthylenesuccinate product with weight-average molecular weight Mw at 113,000.

Example B25

Put 5 g mixed prepolymer particles obtained in Preparation example 8 into a solid-phase polymerization pipe with whose diameter at 1 cm, inject nitrogen gas with methanesulfonic acid concentration Cg at 0.046 mmol/L (linear velocity v=80 cm/s) into the pipe at a flux rate of 100 L/h, then conduct solid-phase polymerization at 150° C. for 30 hours to obtain white polylactic acid prepolymer with weight-average molecular weight Mw at 173,000.

Example B26

Put 5 g poly(L-lactic acid) prepolymer particles obtained in Preparation example 11 into a solid-phase polymerization pipe with whose diameter at 1 cm, inject carbon dioxide gas with methanesulfonic acid concentration Cg at 0.06 mmol/L (linear velocity v=80 cm/s) into the pipe at a flux rate of 100 L/h, then conduct solid-phase polymerization at 160° C. for 30 hours to obtain white poly(L-lactic acid) product with weight-average molecular weight Mw at 193,000.

Example B27

Put 5 g poly(L-lactic acid) prepolymer particles obtained in Preparation example 11 into a solid-phase polymerization pipe with whose diameter at 1 cm, inject carbon dioxide gas with methanesulfonic acid concentration Cg at 0.06 mmol/L (linear velocity v=1 cm/s) into the pipe at a flux rate of 1.25 L/h, then conduct solid-phase polymerization at 160° C. for 30 hours to obtain glay poly(L-lactic acid) product with weight-average molecular weight Mw at 153,000.

Example B28

Put 5 g poly(L-lactic acid) prepolymer particles obtained in Preparation example 11 into a solid-phase polymerization pipe with whose diameter at 1 cm, inject carbon dioxide gas with methanesulfonic acid concentration Cg at 0.046 mmol/L (linear velocity v=161 cm/s) into the pipe at a flux rate of 200 L/h, then conduct solid-phase polymerization at 160° C. for 30 hours to obtain glay poly(L-lactic acid) product with weight-average molecular weight Mw at 195,000.

Example B29

Put 5 g poly(L-lactic acid) prepolymer (Cp=77 mmol/L) particles obtained in Preparation example 20 into a solid-phase polymerization pipe with whose diameter at 1 cm, inject nitrogen gas with para-toluenesulfonic acid concentration Cg at 0.002 mmol/L (linear velocity v=80 cm/s) into the pipe at a flux rate of 100 L/h, then conduct solid-phase polymerization at 160° C. for 30 hours to obtain white poly(L-lactic acid) product with weight-average molecular weight Mw at 197,000. Concentration Cp of sulfonic acid catalyst in poly(L-lactic acid) product measures 36 mmol/L, indicating that Cg/(CpKgp) during the whole solid-phase polymerization is between 0.47 and 1.0.

Example B30

Put 5 g poly(L-lactic acid) prepolymer (Cp=137 mmol/L) particles obtained in Preparation example 21 into a solid-phase polymerization pipe with whose diameter at 1 cm, inject nitrogen gas with para-methanesulfonic acid concentration Cg at 0.046 mmol/L (linear velocity v=40 cm/s) into the pipe at a flux rate of 50 L/h, then conduct solid-phase polymerization at 160° C. for 30 hours to obtain white poly (L-lactic acid) product with weight-average molecular weight Mw at 227,000. Concentration Cp of sulfonic acid catalyst in poly(L-lactic acid) product measures 32 mmol/L, indicating that Cg/(CpKgp) during the whole solid-phase polymerization is between 0.23 and 0.99.

Example B31

Put 60 g poly(L-lactic acid) prepolymer (Cp=94 mmol/L) particles obtained in Preparation example 22 into a solid-phase polymerization pipe with whose diameter at 1 cm, inject nitrogen gas with para-methanesulfonic acid concentration Cg at 0.046 mmol/L (linear velocity v=40 cm/s) into the pipe at a flux rate of 800 L/h, then conduct solid-phase polymerization at 160° C. for 30 hours to obtain white poly (L-lactic acid) product with weight-average molecular weight Mw at 249,000. Concentration Cp of sulfonic acid catalyst in poly(L-lactic acid) product measures 32 mmol/L, indicating that Cg/(CpKgp) during the whole solid-phase polymerization is between 0.34 and 0.98.

Example B32

Put 5 g poly(L-lactic acid) prepolymer (Cp=77 mmol/L) particles obtained in Preparation example 20 into a solid-phase polymerization pipe with whose diameter at 1 cm, inject nitrogen gas with methanesulfonic acid concentration Cg at 0.002 mmol/L (linear velocity v=0.24 cm/s) into the pipe at a flux rate of 0.3 L/h, conduct solid-phase polymerization at 140° C. for 40 hours, and then inject nitrogen gas with para-toluenesulfonic acid concentration Cg at 0.002 mmol/L (linear velocity v=9.6 cm/s) into the pipe at a reflux rate of 12 L/h, conduct solid-phase polymerization at 160° C. for 60 hours to obtain gray poly(L-lactic acid) product with weight-average molecular weight Mw at 367,000.

Example B33

Put 5 g poly(L-lactic acid) prepolymer (Cp=137 mmol/L) particles obtained in Preparation example 21 into a solid-phase polymerization pipe with whose diameter at 1 cm, inject nitrogen gas with methanesulfonic acid concentration Cg at 0.046 mmol/L (linear velocity v=0.24 cm/s) into the pipe at a flux rate of 0.3 L/h, conduct solid-phase polymerization at 140° C. for 40 hours, and then inject nitrogen gas with methanesulfonic acid concentration Cg at 0.046 mmol/L (linear velocity v=9.6 cm/s) into the pipe at a reflux rate of 12 L/h, conduct solid-phase polymerization at 160° C. for 60 hours to obtain gray poly(L-lactic acid) product with weight-average molecular weight Mw at 287,000.

Example B34

Put 60 g poly(L-lactic acid) prepolymer (Cp=94 mmol/L) particles obtained in Preparation example 22 into a solid-phase polymerization pipe with whose diameter at 4 cm, inject nitrogen gas with para-methanesulfonic acid concentration Cg at 0.02 mmol/L (linear velocity v=0.11 cm/s) into the pipe at a flux rate of 2.1 L/h, then conduct solid-phase polymerization at 130° C. for 70 hours to obtain gray poly(L-lactic acid) product with weight-average molecular weight Mw at 188,000.

Example B35

Put 5 g poly(L-lactic acid) prepolymer (Cp=77 mmol/L) particles obtained in Preparation example 20 into a solid-phase polymerization pipe with whose diameter at 1 cm, inject nitrogen gas with methanesulfonic acid concentration Cg at 0.00042 mmol/L (linear velocity v=0.24 cm/s) into the pipe at a flux rate of 0.3 L/h, conduct solid-phase polymerization at 140° C. for 40 hours, and then inject nitrogen gas with para-toluenesulfonic acid concentration Cg at 0.00042 mmol/L (linear velocity v=9.6 cm/s) into the pipe at a reflux rate of 12 L/h, conduct solid-phase polymerization at 160° C. for 60 hours to obtain gray poly(L-lactic acid) product with weight-average molecular weight Mw at 216,000.

Example B36

Put 5 g poly(L-lactic acid) prepolymer (Cp=137 mmol/L) particles obtained in Preparation example 21 into a solid-phase polymerization pipe with whose diameter at 1 cm, inject nitrogen gas with methanesulfonic acid concentration Cg at 0.00075 mmol/L (linear velocity v=0.24 cm/s) into the pipe at a flux rate of 0.3 L/h, conduct solid-phase polymerization at 140° C. for 40 hours, and then inject nitrogen gas with methanesulfonic acid concentration Cg at 0.00075 mmol/L (linear velocity v=9.6 cm/s) into the pipe at a reflux rate of 12 L/h, conduct solid-phase polymerization at 160° C. for 60 hours to obtain gray poly(L-lactic acid) product with weight-average molecular weight Mw at 193,000.

Example B37

Put 60 g poly(L-lactic acid) prepolymer (Cp=94 mmol/L) particles obtained in Preparation example 22 into a solid-phase polymerization pipe with whose diameter at 4 cm, inject nitrogen gas with methanesulfonic acid concentration Cg at 0.00067 mmol/L (linear velocity v=0.11 cm/s) into the pipe at a flux rate of 2.1 L/h, then conduct solid-phase polymerization at 130° C. for 70 hours to obtain gray poly(L-lactic acid) product with weight-average molecular weight Mw at 166,000.

COMPARATIVE EXAMPLES

Comparative Example A1

Put 20 g poly(L-lactic acid) prepolymer particles obtained in Preparation example 1 into a solid-phase polymerization tower and inject non-catalyst nitrogen gas into the tower at a flux rate of 100 L/h, then conduct solid-phase polymerization at 160° C. for 30 hours to obtain white poly(L-lactic acid) product with whose weight-average molecular weight Mw, melting point Tm and thermal degradation rate respectively at 97,000, 168° C. and 1.283 wt % min.

Comparative Example A2

Put 20 g poly(L-lactic acid) prepolymer particles obtained in Preparation example 2 into a solid-phase polymerization tower and inject non-catalyst nitrogen gas into the tower at a flux rate of 100 L/h, then conduct solid-phase polymerization at 160° C. for 30 hours to obtain white poly(L-lactic acid) product with whose weight-average molecular weight Mw, melting point Tm and thermal degradation rate respectively at 42,000, 162° C. and 0.002 wt % min.

Comparative Example A3

Put 20 g poly(D-lactic acid) prepolymer particles obtained in Preparation example 3 into a solid-phase polymerization tower and inject non-catalyst nitrogen gas into the tower at a flux rate of 100 L/h, then conduct solid-phase polymerization at 160° C. for 30 hours to obtain white poly(D-lactic acid) product with whose weight-average molecular weight Mw, melting point Tm and thermal degradation rate respectively at 35,000, 161° C. and 0.001 wt % min.

Comparative Example A4

Put 20 g poly(L-lactic acid) prepolymer particles obtained in Preparation example 4 into a solid-phase polymerization tower and inject non-catalyst nitrogen gas into the tower at a flux rate of 100 L/h, then conduct solid-phase polymerization at 160° C. for 30 hours to obtain white poly(L-lactic acid) product with whose weight-average molecular weight Mw, melting point Tm and thermal degradation rate respectively at 75,000, 163° C. and 0.007 wt % min.

Comparative Example A5

Put 20 g poly(L-lactic acid) prepolymer particles obtained in Preparation example 5 into a solid-phase polymerization tower and inject non-catalyst nitrogen gas into the tower at a flux rate of 100 L/h, then conduct solid-phase polymerization at 160° C. for 30 hours to obtain white poly(L-lactic acid) product with whose weight-average molecular weight Mw, melting point Tm and thermal degradation rate respectively at 61,000, 165° C. and 0.005 wt % min.

Comparative Example A6

Put 20 g polyglycolic acid prepolymer particles obtained in Preparation example 6 into a solid-phase polymerization tower and inject non-catalyst nitrogen gas into the tower at a flux rate of 100 L/h, then conduct solid-phase polymerization at 190° C. for 30 hours to obtain white polyglycolic acid product with whose weight-average molecular weight Mw, melting point Tm respectively at 31,000, and 214° C.

Comparative Example A7

Put 20 g poly(butyl succiate) prepolymer particles obtained in Preparation example 7 into a solid-phase polymerization tower and inject non-catalyst nitrogen gas into the tower at a flux rate of 100 L/h, then conduct solid-phase polymerization at 100° C. for 30 hours to obtain white poly(butyl succiate) product with whose weight-average molecular weight Mw, melting point Tm respectively at 43,000, and 115° C.

Comparative Example A8

Put 20 g co-polyester prepolymer particles obtained in Preparation example 8 into a solid-phase polymerization tower and inject non-catalyst nitrogen gas into the tower at a flux rate of 100 L/h, then conduct solid-phase polymerization at 150° C. for 30 hours to obtain white co-polyester product with whose weight-average molecular weight Mw, melting point Tm respectively at 37,000, and 163° C.

Comparative Example A9

Put 20 g poly(L-lactic acid) prepolymer particles obtained in Preparation example 9 into a solid-phase polymerization tower and inject non-catalyst nitrogen gas into the tower at a flux rate of 100 L/h, then conduct solid-phase polymerization at 160° C. for 30 hours to obtain white poly(L-lactic acid) product with whose weight-average molecular weight Mw, melting point Tm and thermal degradation rate respectively at 23,000, 163° C. and 0.003 wt % min.

Comparative Example B1

Put 5 g poly(L-lactic acid) prepolymer particles obtained in Preparation example 9 into a solid-phase polymerization pipe with diameter of 1 cm and inject high-purity nitrogen gas (v=40 cm/s, dew point of nitrogen gas lower than −70° C., hereinafter inclusive) into the tower at a flux rate of 50 L/h, then conduct solid-phase polymerization at 160° C. for 30 hours to obtain white poly(L-lactic acid) product with weight-average molecular weight Mw at 26,000.

Comparative Example B2

Put 5 g poly(L-lactic acid) prepolymer (Cp=67 mmol/L) particles obtained in Preparation example 10 into a solid-phase polymerization pipe with diameter of 1 cm and inject high-purity nitrogen gas (v=40 cm/s) into the tower at a flux rate of 50 L/h, then conduct solid-phase polymerization at 160° C. for 30 hours to obtain white poly(L-lactic acid) product with weight-average molecular weight Mw at 35,000.

Comparative Example B3

Put 5 g poly(L-lactic acid) prepolymer (Cp=132 mmol/L) particles obtained in Preparation example 11 into a solid-phase polymerization pipe with diameter of 1 cm and inject high-purity nitrogen gas (v=40 cm/s) into the tower at a flux rate of 50 L/h, then conduct solid-phase polymerization at 160° C. for 30 hours to obtain white poly(L-lactic acid) product with weight-average molecular weight Mw at 51,000.

Comparative Example B4

Put 5 g poly(L-lactic acid) prepolymer (Cp=350 mmol/L) particles obtained in Preparation example 12 into a solid-phase polymerization pipe with diameter of 1 cm and inject high-purity nitrogen gas (v=40 cm/s) into the tower at a flux rate of 50 L/h, then conduct solid-phase polymerization at 160° C. for 30 hours to obtain canary yellow poly(L-lactic acid) product with weight-average molecular weight Mw at 62,000.

Comparative Example B5

Put 5 g poly(L-lactic acid) prepolymer (Cp=401 mmol/L) particles obtained in Preparation example 13 into a solid-phase polymerization pipe with diameter of 1 cm and inject high-purity nitrogen gas (v=40 cm/s) into the tower at a flux rate of 50 L/h, then conduct solid-phase polymerization at 160° C. for 30 hours to obtain coffee-color poly(L-lactic acid) product with weight-average molecular weight Mw at 65,000.

Comparative Example B6

Put 5 g poly(L-lactic acid) prepolymer (Cp=47 mmol/L) particles obtained in Preparation example 14 into a solid-phase polymerization pipe with diameter of 1 cm and inject high-purity nitrogen gas (v=40 cm/s) into the tower at a flux rate of 50 L/h, then conduct solid-phase polymerization at 160° C. for 30 hours to obtain white poly(L-lactic acid) product with weight-average molecular weight Mw at 48,000.

Comparative Example B7

Put 5 g poly(L-lactic acid) prepolymer (Cp=23 mmol/L) particles obtained in Preparation example 15 into a solid-phase polymerization pipe with diameter of 1 cm and inject high-purity nitrogen gas (v=40 cm/s) into the tower at a flux rate of 50 L/h, then conduct solid-phase polymerization at 160° C. for 30 hours to obtain white poly(L-lactic acid) product with weight-average molecular weight Mw at 56,000.

Comparative Example B8

Put 5 g poly(L-lactic acid) prepolymer (Cp=67 mmol/L) particles obtained in Preparation example 16 into a solid-phase polymerization pipe with diameter of 1 cm and inject high-purity nitrogen gas (v=80 cm/s) into the tower at a flux rate of 100 L/h, then conduct solid-phase polymerization at 160° C. for 30 hours to obtain white poly(L-lactic acid) product with weight-average molecular weight Mw at 87,000.

Comparative Example B9

Put 5 g poly(L-lactic acid) prepolymer (Cp=77 mmol/L) particles obtained in Preparation example 20 into a solid-phase polymerization pipe with diameter of 1 cm and inject high-purity nitrogen gas (v=80 cm/s) into the tower at a flux rate of 100 L/h, then conduct solid-phase polymerization at 160° C. for 30 hours to obtain white poly(L-lactic acid) product with weight-average molecular weight Mw at 86,000.

Comparative Example B10

Put 5 g poly(L-lactic acid) prepolymer (Cp=137 mmol/L) particles obtained in Preparation example 21 into a solid-phase polymerization pipe with diameter of 1 cm and inject high-purity nitrogen gas (v=40 cm/s) into the tower at a flux rate of 50 L/h, then conduct solid-phase polymerization at 160° C. for 30 hours to obtain white poly(L-lactic acid) product with weight-average molecular weight Mw at 48,000.

Comparative Example B11

Put 60 g poly(L-lactic acid) prepolymer (Cp=94 mmol/L) particles obtained in Preparation example 22 into a solid-phase polymerization pipe with diameter of 4 cm and inject high-purity nitrogen gas (v=40 cm/s) into the tower at a flux rate of 800 L/h, then conduct solid-phase polymerization at 160° C. for 30 hours to obtain white poly(L-lactic acid) product with weight-average molecular weight Mw at 39,000.

Comparative Example B12

Put 5 g poly(L-lactic acid) prepolymer (Cp=77 mmol/L) particles obtained in Preparation example 20 into a solid-phase polymerization pipe with diameter of 1 cm and inject high-purity nitrogen gas (v=0.24 cm/s) into the tower at a flux rate of 0.3 L/h, then conduct solid-phase polymerization at 140° C. for 40 hours to obtain gray poly(L-lactic acid) product with weight-average molecular weight Mw at 67,000.

Comparative Example B13

Put 5 g poly(L-lactic acid) prepolymer (Cp=137 mmol/L) particles obtained in Preparation example 21 into a solid-phase polymerization pipe with diameter of 1 cm and inject high-purity nitrogen gas (v=0.24 cm/s) into the tower at a flux rate of 0.3 L/h, then conduct solid-phase polymerization at 140° C. for 40 hours to obtain gray poly(L-lactic acid) product with weight-average molecular weight Mw at 45,000.

Comparative Example B14

Put 5 g poly(L-lactic acid) prepolymer (Cp=77 mmol/L) particles obtained in Preparation example 20 into a solid-phase polymerization pipe with diameter of 1 cm and inject high-purity nitrogen gas (v=0.24 cm/s) into the tower at a flux rate of 0.3 L/h, then conduct solid-phase polymerization at 140° C. for 40 hours; inject high-purity nitrogen gas (v=9.6 cm/s) into the tower at a flux rate of 12 L/h and conduct solid-phase polymerization at 160° C. for 60 hours to obtain gray poly(L-lactic acid) product with weight-average molecular weight Mw at 146,000 (yield: 95.0%, sulfur content in the product: 140 ppm).

Comparative Example B15

Put 5 g poly(L-lactic acid) prepolymer (Cp=137 mmol/L) particles obtained in Preparation example 21 into a solid-phase polymerization pipe with diameter of 1 cm and inject high-purity nitrogen gas (v=0.24 cm/s) into the tower at a flux rate of 0.3 L/h, then conduct solid-phase polymerization at 140° C. for 40 hours; inject high-purity nitrogen gas (v=9.6 cm/s) into the tower at a flux rate of 12 L/h and conduct solid-phase polymerization at 160° C. for 60 hours to obtain gray poly(L-lactic acid) product with weight-average molecular weight Mw at 133,000 (yield: 95.0%, sulfur content in the product: 110 ppm).

Comparative Example B16

Put 60 g poly(L-lactic acid) prepolymer (Cp=94 mmol/L) particles obtained in Preparation example 22 into a solid-phase polymerization pipe with diameter of 4 cm and inject high-purity nitrogen gas (v=0.11 cm/s) into the tower at a flux rate of 2.1 L/h, then conduct solid-phase polymerization at 130° C. for 70 hours to obtain gray poly(L-lactic acid) product with weight-average molecular weight Mw at 126,000 (yield: 98.5%, sulfur content in the product: 2380 ppm).

To show our effects more directly, representative Examples and comparative examples are summed up in Table 1. It can be found out clearly in table 1 that the aliphatic polyester prepared under catalyst-containing gas stream in our solid-phase polymerization methods gain advantages of high molecular weight and thermal stability and possibility of not containing metal. Compared to the solid-phase polymerization method conducted under non-catalyst gas stream, the product prepared in our solid-phase polymerization methods have much higher molecular weight and much faster polymerization speed.

TABLE 1

| | Prepolymer | | | | Gas Stream | | | |
| --- | --- | --- | --- | --- | --- | --- | --- | --- |
| | Prepolymer | Catalyst | [S]/ppm | Cp(mmol/L) | Gas | Flux(L/h) | Catalyst | Cg(mmol/L) |
| Example Example A1 | Prepare example 1 | MSA | 3429 | 134 | N2 | 100 | MSA | 0.06 |
| Compare example Compare example A1 | Prepare example 1 | MSA | 3429 | 134 | N2 | 100 | — | — |

TABLE 1-continued

| | | | | | | | | |
|---|---|---|---|---|---|---|---|---|
| Example A2 | Prepare example 2 | MSA | 6667 | 260 | N2 | 100 | MSA | 0.06 |
| Compare example A2 | Prepare example 2 | MSA | 6667 | 260 | N2 | 100 | — | — |
| Example A3 | Prepare example 3 | MSA | 681 | 27 | N2 | 100 | MSA | 0.06 |
| Compare example A3 | Prepare example 3 | MSA | 681 | 27 | N2 | 100 | — | — |
| Example A4 | Prepare example 4 | H2SO4 | 676 | 26 | N2 | 100 | MSA | 0.06 |
| Compare example A4 | Prepare example 4 | H2SO4 | 676 | 26 | N2 | 100 | — | — |
| Example A5 | Prepare example 5 | TSA | 1530 | 60 | N2 | 100 | MSA | 0.06 |
| Compare example A5 | Prepare example 5 | TSA | 1530 | 60 | N2 | 100 | — | — |
| Example A6 | Prepare example 6 | TSA | 1837 | 72 | N2 | 100 | MSA | 0.06 |
| Compare example A6 | Prepare example 6 | TSA | 1837 | 72 | N2 | 100 | — | — |
| Example A7 | Prepare example 7 | MSA | 562 | 22 | N2 | 100 | TFMSA | 0.06 |
| Compare example A7 | Prepare example 7 | MSA | 562 | 22 | N2 | 100 | — | — |
| Example A8 | Prepare example 8 | MSA | | | N2 | 100 | MSA | 0.06 |
| Compare example A8 | Prepare example 8 | MSA | | | N2 | 100 | — | — |
| Example A9 | Prepare example 9 | — | | | N2 | 100 | MSA | 0.06 |
| Compare example A9 | Prepare example 9 | — | | | N2 | 100 | — | — |

| | Solid state polymerization(SSP) Temperature °C. | SSP Time h | Mw k | Melt point Tm/°C. | Thermal degradation Rate (wt %/min) | Metal containing |
|---|---|---|---|---|---|---|
| Example A1 | 160 | 30 | 223 | 171 | 0.383 | Yes |
| Compare example A1 | 160 | 30 | 97 | 168 | 1.283 | Yes |
| Example A2 | 160 | 30 | 237 | 172 | 0.003 | No |
| Compare example A2 | 160 | 30 | 42 | 162 | 0.002 | No |
| Example A3 | 160 | 30 | 203 | 171 | 0.002 | No |
| Compare example A3 | 160 | 30 | 35 | 161 | 0.001 | No |
| Example A4 | 160 | 30 | 175 | 170 | 0.006 | No |
| Compare example A4 | 160 | 30 | 75 | 163 | 0.007 | No |
| Example A5 | 160 | 30 | 186 | 171 | 0.004 | No |
| Compare example A5 | 160 | 30 | 61 | 165 | 0.005 | No |
| Example A6 | 190 | 30 | 95 | 218 | | No |
| Compare example A6 | 190 | 30 | 31 | 214 | | No |
| Example A7 | 100 | 30 | 86 | 118 | | No |
| Compare example A7 | 100 | 30 | 43 | 115 | | No |
| Example A8 | 150 | 30 | 127 | 165 | | No |
| Compare example A8 | 150 | 30 | 37 | 163 | | No |
| Example A9 | 160 | 30 | 227 | 174 | 0.002 | No |
| Compare example A9 | 160 | 30 | 23 | 163 | 0.003 | No |

The invention claimed is:

1. A solid-phase polymerization method of preparing aliphatic polyester comprising a gas stream containing a sulfonic acid catalyst, then flowing the gas stream containing sulfonic acid catalyst into a reactor, and then carrying out solid-phase polymerization of aliphatic polyester prepolymer in the reactor, wherein a concentration Cg of said sulfonic acid catalyst in the gas stream is 0.0001 mmol/L to 1 mmol/L.

2. The method according to claim 1, wherein said sulfonic acid catalyst is one or multiple of monosulfonic acid of C1-C20 and monosulfonic acid of C1-C20 substituted by halogen.

3. The method according to claim 1, wherein the concentration Cg of said sulfonic acid catalyst in the gas stream is 0.0005 mmol/L to 0.2 mmol/L.

4. The method according to claim 3, wherein the concentration Cg of said sulfonic acid catalyst in the gas stream is 0.001 mmol/L to 0.1 mmol/L.

5. The method according to claim 1, wherein during the solid-phase polymerization, concentration Cp of sulfonic acid catalyst in aliphatic polyester prepolymer is 10 mmol/L to 350 mmol/L.

6. The method according to claim 5, wherein during the solid-phase polymerization, concentration Cp of sulfonic acid catalyst in aliphatic polyester prepolymer is 20 mmol/L to 150 mmol/L.

7. The method according to claim 1, wherein concentration Cg of sulfonic acid catalyst in the gas stream during the solid-phase polymerization, concentration Cp of sulfonic acid catalyst in aliphatic polyester prepolymer and partition coefficient Kgp of sulfonic acid catalyst in gas stream and aliphatic polyester prepolymer at a temperature for solid-phase polymerization meet formula (1):

$$0.1 \leq \frac{Cg}{CpKgp} \leq 10. \tag{1}$$

8. The method according to claim 1, wherein linear velocity of the gas stream during solid-phase polymerization is 1 cm/s to 200 cm/s.

9. The method according to claim 1, wherein the aliphatic polyester prepolymer contains more than 50 mol % of hydroxy carboxylic acid units.

10. The method according to claim 9, wherein the aliphatic polyester prepolymer is polylactic acid or polyglycolic acid.

11. The method according to claim 1, wherein weight-average molecular weight Mw of said aliphatic polyester prepolymer before and after solid-phase polymerization respectively is 8000 to 30000 and 100000 to 500000; average growth speed of Mw in solid-phase polymerization is greater than or equal to 3500/h.

* * * * *